United States Patent
Weller

(10) Patent No.: US 12,490,681 B2
(45) Date of Patent: Dec. 9, 2025

(54) SYSTEMS FOR MONITORING AND USING MAT THICKNESS AND BALE GROWTH RATE

(71) Applicant: AGCO Corporation, Duluth, GA (US)

(72) Inventor: Lucas Andrew Weller, Hesston, KS (US)

(73) Assignee: AGCO CORPORATION, Duluth, GA (US)

( * ) Notice: Subject to any disclaimer, the term of this patent is extended or adjusted under 35 U.S.C. 154(b) by 904 days.

(21) Appl. No.: 17/659,961

(22) Filed: Apr. 20, 2022

(65) Prior Publication Data

US 2022/0330486 A1 Oct. 20, 2022

Related U.S. Application Data

(60) Provisional application No. 63/176,954, filed on Apr. 20, 2021.

(51) Int. Cl.
| | | |
|---|---|---|
| A01F 15/08 | (2006.01) | |
| A01D 89/00 | (2006.01) | |
| A01F 15/07 | (2006.01) | |

(52) U.S. Cl.
CPC ........ *A01F 15/0833* (2013.01); *A01D 89/002* (2013.01); *A01F 15/07* (2013.01); *A01F 2015/078* (2013.01)

(58) Field of Classification Search
None
See application file for complete search history.

(56) References Cited

U.S. PATENT DOCUMENTS

| | | | |
|---|---|---|---|
| 2014/0165528 A1 | 6/2014 | Olander et al. | |
| 2014/0261023 A1* | 9/2014 | Smith | A01F 15/0833 100/45 |
| 2020/0214219 A1* | 7/2020 | Lebeau | B65B 57/04 |

FOREIGN PATENT DOCUMENTS

| | | | |
|---|---|---|---|
| EP | 875136 B1 * | 8/2004 | ......... A01F 15/0833 |
| EP | 3679784 A1 | 7/2020 | |
| WO | 2013/096959 A1 | 6/2013 | |
| WO | 2016/014675 A1 | 1/2016 | |

OTHER PUBLICATIONS

UK Intellectual Property Office, Search Report for related UK Application No. GB2106127.0, dated Oct. 22, 2021.

* cited by examiner

*Primary Examiner* — Christian Chace
*Assistant Examiner* — Shayne M. Gilbertson

(57) ABSTRACT

A system and method for monitoring bale growth rate and mat thickness and controlling baler operations according to the monitoring of bale growth rate and mat thickness. A baler includes sensors and a control system that uses sensor output as input for its processes. The controller is configured to determine a value of a physical attribute in an operation of a baler based on data received from a sensor. Also, the controller is configured to estimate a mat thickness or a bale growth rate based on the determined value of the physical attribute. The controller is also configured to control an operation of the baler or an operation of a tow vehicle, configured to tow the baler, based on the estimated mat thickness or bale growth rate.

9 Claims, 13 Drawing Sheets

700

```
┌─────────────────────────────────────────────────────────────┐
│ Sensing, by a sensor of a round baler, a physical attribute │
│ associated with a moving part of the round baler while the  │
│ round baler is operating in a crop field                    │
│ 702                                                         │
└─────────────────────────────────────────────────────────────┘
                              │
                              ▼
┌─────────────────────────────────────────────────────────────┐
│ Receiving from the sensor, by a controller of the round     │
│ baler, data corresponding to the sensed physical attribute  │
│ 704                                                         │
└─────────────────────────────────────────────────────────────┘
                              │
                              ▼
┌─────────────────────────────────────────────────────────────┐
│ Determining, by the controller, a value of the physical     │
│ attribute based on the received data                        │
│ 706                                                         │
└─────────────────────────────────────────────────────────────┘
                              │
                              ▼
┌─────────────────────────────────────────────────────────────┐
│ Estimating, by the controller, a mat thickness generated by │
│ the round baler based on the determined value of the        │
│ physical attribute                                          │
│ 708                                                         │
└─────────────────────────────────────────────────────────────┘
                              │
                              ▼
┌─────────────────────────────────────────────────────────────┐
│ Controlling, by the controller, an operation of the baler   │
│ or an operation of a tow vehicle, configured to tow the     │
│ baler, based on the estimated mat thickness                 │
│ 710                                                         │
└─────────────────────────────────────────────────────────────┘
```

FIG. 7

SYSTEMS FOR MONITORING AND USING MAT THICKNESS AND BALE GROWTH RATE

CROSS REFERENCE TO RELATED APPLICATIONS

This application claims the benefit of U.S. Provisional Application No. 63/176,954, filed Apr. 20, 2021, which is hereby incorporated by reference in its entirety.

TECHNICAL FIELD

The present disclosure relates to systems for monitoring and using mat thickness and bale growth rate, including using monitored mat thickness and bale growth rate as control system inputs.

BACKGROUND

An agricultural baler collects crop material, such as hay, and compresses and arranges the crop material into a bale for easy transport and storage. Often grass in a hay field is cut and raked into windrows and allowed to dry. Afterwards, a baler collects the crop from the windrows to be compressed and arranged into bales. The baler can be pulled by a tractor or another type of tow vehicle or self-propelled. A baler gathers the crop material, moves the gathered material it to an internal baling chamber, and compresses and arranges the material into a bale. Typically, a bale is round or square. A round bale is a cylindrically shaped bale and often produced by a round baler. A square bale is a cube shaped bale and often produced by a square baler.

Some common round balers include a spinning pickup header that engages cut crop material in a windrow and directs it to rotors, augers, and other components of a feed mechanism that in turn moves the material to a baling chamber. The baling chamber can include a series of compression belts that receive the material. The belts in some example bailers move outward into the moving material so that a portion of a belt presses on an outer surface of a forming bale. The bale increases in size as more crop material is fed into the baling chamber until forming of the bale is complete. Once the bale is formed, a wrapping system wraps the bale with a bale wrap that can include a plastic sheet, net, or other type of bale wrap. A rear tailgate of a baler ejects the bale, and the process repeats itself for the next bale. An analogous process can used to create a square bale. With producing square bales, the compression belts of the baling chamber are arranged to form square bales instead of round bales.

Typically, when a baler is moved through a field, the operator of the baler changes speeds of the movement to accommodate for the varying amounts of crop in a windrow or other operating conditions. If the speed of the baler increases, it may overload its pickup headers or pressure-exerting belts resulting in a clog or unevenly distributed bale. On the other hand, if the speed of the baler decreases, efficiencies of the baler may decline. Also, mat thickness and bale growth rate is effected by the ground speed of a baler.

Because current balers are unable to provide an operator feedback regarding mat thickness and bale growth rate as a baler moves along a windrow, operators are unable to accurately and efficiently determine at what speed to drive a baler or operate a tractor pulling a baler, otherwise accurately and efficiently adjust operating parameters to achieve an acceptable or a selected baling performance or bale density. There thus remains a need for a baler that provides feedback to a user during operation such as a real-time indication of mat thickness or bale growth rate of the baler.

SUMMARY

Described herein are systems and methods for monitoring and using mat thickness and bale growth rate, including using monitored mat thickness and bale growth rate as control system inputs. Specifically, described herein are systems and methods for monitoring mat thickness and bale growth rate in a baler and using the monitored mat thickness and bale growth rate as control system inputs for operations of the baler, such as using the inputs for controlling ground speed of the baler. In monitoring mat thickness and bale growth rate in a baler and using the monitored mat thickness and bale growth rate as control system inputs, the systems and methods overcome some technical problems in farming of crops. Also, the systems and methods (or techniques) disclosed herein provide specific technical solutions to at least overcome the technical problems mentioned in the background section and other parts of the application as well as other technical problems not described herein but recognized by those skilled in the art.

In providing the technical solutions, in some embodiments, the systems and methods are for monitoring mat thickness in a baler and using the monitored mat thickness as a control system input for operations of the baler, such as using the input for controlling ground speed of the baler. In some other embodiments, the systems and methods are for monitoring bale growth rate in a baler and using the monitored bale growth rate as a control system input for operations of the baler, such as using the input for controlling ground speed of the baler. In some embodiments, the systems and methods are for monitoring both matt thickness and bale growth rate in a baler and using the monitored matt thickness and bale growth rate as control system inputs for operations of the baler, such as using the inputs for controlling ground speed of the baler.

In some embodiments, a baler includes sensors and a control system that uses sensor output as input for its processes. The controller is configured to determine a value of a physical attribute in an operation of a baler based on data received from a sensor. Also, the controller is configured to estimate a mat thickness or a bale growth rate based on the determined value of the physical attribute. The controller is also configured to control an operation of the baler or an operation of a tow vehicle, configured to tow the baler, based on the estimated mat thickness or bale growth rate.

Also, the technologies described herein include a through-put control and indicator for an operator of a baler. The control and indication of the through-put is based on a thickness of a mat of crop to be formed (such as rolled) into a bale by the baler or on bale growth rate, depending on the embodiment. In some embodiments, the technologies are a foundation of a tractor implement management system (TIMS). As described in detail herein, a round baler collects loose crop and forms the loose crop into a mat that is rolled into a round bale. A mat thickness of the mat is related to a density of a bale formed from the mat. For example, during consistent hay conditions, if a bale has a mat thickness of 6", it will not be as dense as a bale with a mat thickness smaller because the hay is wrapped and compressed better. In some embodiments, the technologies provide an indication of the density of bales formed by a baler and the output used for the indication is useable for control of the baler. This control is used to form bales according to a selected bale density. Also, the indication provides the operator with directions to drive slower or faster to achieve a selected bale density. The indication also provides the operator with directions for other types of operations of the baler to achieve a selected bale density. Also, it provides the operator with directions to achieve improved bale generation efficiency, balancing the selected density and costs (such as time costs). The information retrieved by the operations of the baler also provides mass flow information, which is used to generate a yield map in some examples. In some embodiments, the yield map is an included feature with the TIMS.

Although, for the most part, the technologies described herein use mat thickness as input for through-put control and indication of round bales, analogous technologies are useable for through-put control and indication of square bales. For example, instead of using mat thickness as input for through-put control and indication, various attributes associated with operations of a square baler and bale density (e.g., plunger-to-stuffer ratio) are useable for through-put control and indication of square bales. Thus, it is to be understood that the methods and systems described herein are related to yield control and indication for round and square bales. Also, bale growth rate is useable as input for through-put control and indication for square or round bales.

With respect to some embodiments, disclosed herein are computerized methods for monitoring mat thickness or bale growth rate, or a combination thereof in a baler and using the one or more monitored attributes in the baler as one or more respective control system inputs for operations of the baler, such as ground speed of the baler, as well as a non-transitory computer-readable storage medium for carrying out technical operations of the computerized methods. The non-transitory computer-readable storage medium has tangibly stored thereon, or tangibly encoded thereon, computer readable instructions that when executed by one or more devices (e.g., one or more personal computers or servers) cause at least one processor to perform a method for monitoring mat thickness or bale growth rate, or a combination thereof in a baler and using the one or more monitored attributes in the baler as one or more respective control system inputs for operations of the baler, such as ground speed of the baler.

For example, in some embodiments, a method includes sensing, by a sensor of a round baler, a physical attribute associated with a moving part of the round baler while the round baler is operating in a crop field. The method also includes receiving from the sensor, by a controller of the round baler, data corresponding to the sensed physical attribute and determining, by the controller, a value of the physical attribute based on the received data. Also, the method includes estimating, by the controller, a mat thickness generated by the round baler based on the determined value of the physical attribute and controlling, by the controller, an operation of the baler or an operation of a tow vehicle, configured to tow the baler, based on the estimated mat thickness.

In some embodiments, the sensor is a pressure sensor, and the sensed physical attribute is a sensed pressure associated with the moving part.

In some embodiments, the sensor is a position sensor, and the sensed physical attribute is a sensed displacement the moving part.

In some embodiments, the sensor is a speed sensor, the moving part is a rotating part of a crop pickup portion of the baler, and the sensed physical attribute is a sensed speed of the moving part.

In some embodiments, the moving part is a tension arm of the baler, the tension arm is operable to expand or contract a perimeter including compression belts of the baler, and the perimeter is a structure and mechanism for holding and forming the bale by exerting tension on outer portions of the bale.

In some embodiments, the moving part is a movable part of a crop pickup portion of the baler.

In some embodiments, the moving part is a movable floor of a crop pickup portion of the baler.

In some embodiments, the controlling of the operation includes changing ground speed of the baler automatically without input from an operator.

In some embodiments, the method includes displaying, by a display device, information to an operator of the baler or the tow vehicle such that the information directs the operator to change a ground speed of the baler, based on the estimated mat thickness.

In some embodiments, the method includes discharging, by the baler, multiple bales, as well as displaying, by a display device, a yield map based on tracking of the discharged multiple bales and the estimated mat thickness.

In some embodiments, the method includes repeating the sensing of the physical attribute while the round baler is operating in the crop field to obtain a set of data points of the physical attribute. Also, in such embodiments, the method includes: receiving, by the controller, the set of data points; determining, by the controller, a set of values representative of the physical attribute based on the set of data points; and estimating, by the controller, a change or a rate of change in the mat thickness based on the determined set of values. Further, in such embodiments, the method includes controlling, by the controller, the operation of the baler or the operation of the tow vehicle based on the estimated change or rate of change in the mat thickness.

In some embodiments, the method includes sensing, by a second sensor, a second physical attribute associated with the ground speed of the round baler while the round baler is moving forward in the crop field. In such embodiments, the method also includes: receiving from the second sensor, by the controller, second data corresponding to the sensed second physical attribute; determining, by the controller, a second value of the second physical attribute based on the received second data; and estimating, by the controller, a second mat thickness based on the determined value of the physical attribute associated with the moving part and the determined second value of the second physical attribute associated with the ground speed of the round baler. Also, in such embodiments, the method includes controlling, by the controller, the operation of the baler or the operation of the tow vehicle based on the estimated second mat thickness.

In some embodiments, the method includes sensing, by a second sensor of the round baler, a second physical attribute associated with a second moving part of the round baler while the round baler is operating in the crop field. In such embodiments, the method also includes: receiving from the second sensor, by the controller, second data corresponding to the sensed second physical attribute; determining, by the controller, a second value of the second physical attribute based on the received second data; and estimating, by the controller, a second mat thickness generated by the round baler based on the determined value of the physical attribute and the determined second value of the second physical attribute. Also, in such embodiments, the method includes controlling, by the controller, the operation of the baler or the operation of the tow vehicle, based on the estimated second mat thickness.

In some of the embodiments including the sensing of the second physical attribute associated with the second moving part of the round baler, the second sensor is a pressure sensor, and the sensed second physical attribute is a sensed pressure associated with the second moving part. Also, the sensor is a position sensor or a speed sensor.

In some of the embodiments including the sensing of the second physical attribute associated with the second moving part of the round baler, the second sensor is a position sensor, and the sensed second physical attribute is a sensed displacement of the second moving part. Also, the sensor is a pressure sensor or a speed sensor.

In some of the embodiments including the sensing of the second physical attribute associated with the second moving part of the round baler, the second sensor is a speed sensor, the second moving part is a rotating part of a crop pickup portion of the baler, and the sensed second physical attribute is a sensed speed of the second moving part. Also, the sensor is a position sensor or a pressure sensor.

In some of the embodiments including the sensing of the second physical attribute associated with the second moving part of the round baler, the moving part is a movable part of a crop pickup portion of the baler, and the second moving part is a tension arm of the baler. In such embodiments, the tension arm is operable to expand or contract a perimeter including compression belts of the baler. The perimeter is a structure and mechanism for holding and forming the bale by exerting tension on outer portions of the bale.

In some of the embodiments including the sensing of the second physical attribute associated with the second moving part of the round baler, the second moving part is a movable part of a crop pickup portion of the baler, and the moving part is a tension arm of the baler. In such embodiments, the tension arm is operable to expand or contract a perimeter including compression belts of the baler. The perimeter is a structure and mechanism for holding and forming the bale by exerting tension on outer portions of the bale.

With respect to some embodiments, a system is provided that includes a computing device, having a processor and a non-transitory computer-readable storage medium for tangibly storing thereon computer program code for execution by the processor. The computer program code incudes executable logic executable to receive, from a sensor, data corresponding to a sensed physical attribute associated with a moving part of a round baler while the round baler is operating in a crop field. The sensor is a part of the baler, and the senor senses the physical attribute. The computer program code incudes also includes executable logic executable to determine a value of the physical attribute based on the received data and executable logic executable to estimate a mat thickness generated by the round baler based on the determined value of the physical attribute. And, the computer program code incudes executable logic executable to control an operation of the baler or an operation of a tow vehicle, configured to tow the baler, based on the estimated mat thickness.

With respect to some embodiments, a non-transitory computer-readable storage medium is provided. The non-transitory computer-readable storage medium is tangibly encoded with computer-executable instructions, that when executed by a processor of a computing device the processor performs a method having the following operations: receiving, from a sensor, data corresponding to a sensed physical attribute associated with a moving part of a round baler while the round baler is operating in a crop field, wherein the sensor is a part of the baler, and wherein the senor senses the physical attribute; determining a value of the physical attribute based on the received data; estimating mat thickness generated by the round baler based on the determined value of the physical attribute; and controlling an operation of the baler or an operation of a tow vehicle, configured to tow the baler, based on the estimated mat thickness.

These and other important aspects of the invention are described more fully in the detailed description below. The invention is not limited to the particular methods and systems described herein. Other embodiments can be used and changes to the described embodiments can be made without departing from the scope of the claims that follow the detailed description.

BRIEF DESCRIPTION OF THE DRAWINGS

The present disclosure will be understood more fully from the detailed description given below and from the accompanying drawings of various embodiments of the disclosure.

FIGS. 7, 8, 9, 11, 12, and 13 illustrate example methods in accordance with some embodiments of the present disclosure.

DETAILED DESCRIPTION OF EXAMPLE EMBODIMENTS

Details of example embodiments of the invention are described in the following detailed description with reference to the drawings. Although the detailed description provides reference to example embodiments, it is to be understood that the invention disclosed herein is not limited to such example embodiments. But to the contrary, the invention disclosed herein includes numerous alternatives, modifications and equivalents as will become apparent from consideration of the following detailed description and other parts of this disclosure.

Figure 1:
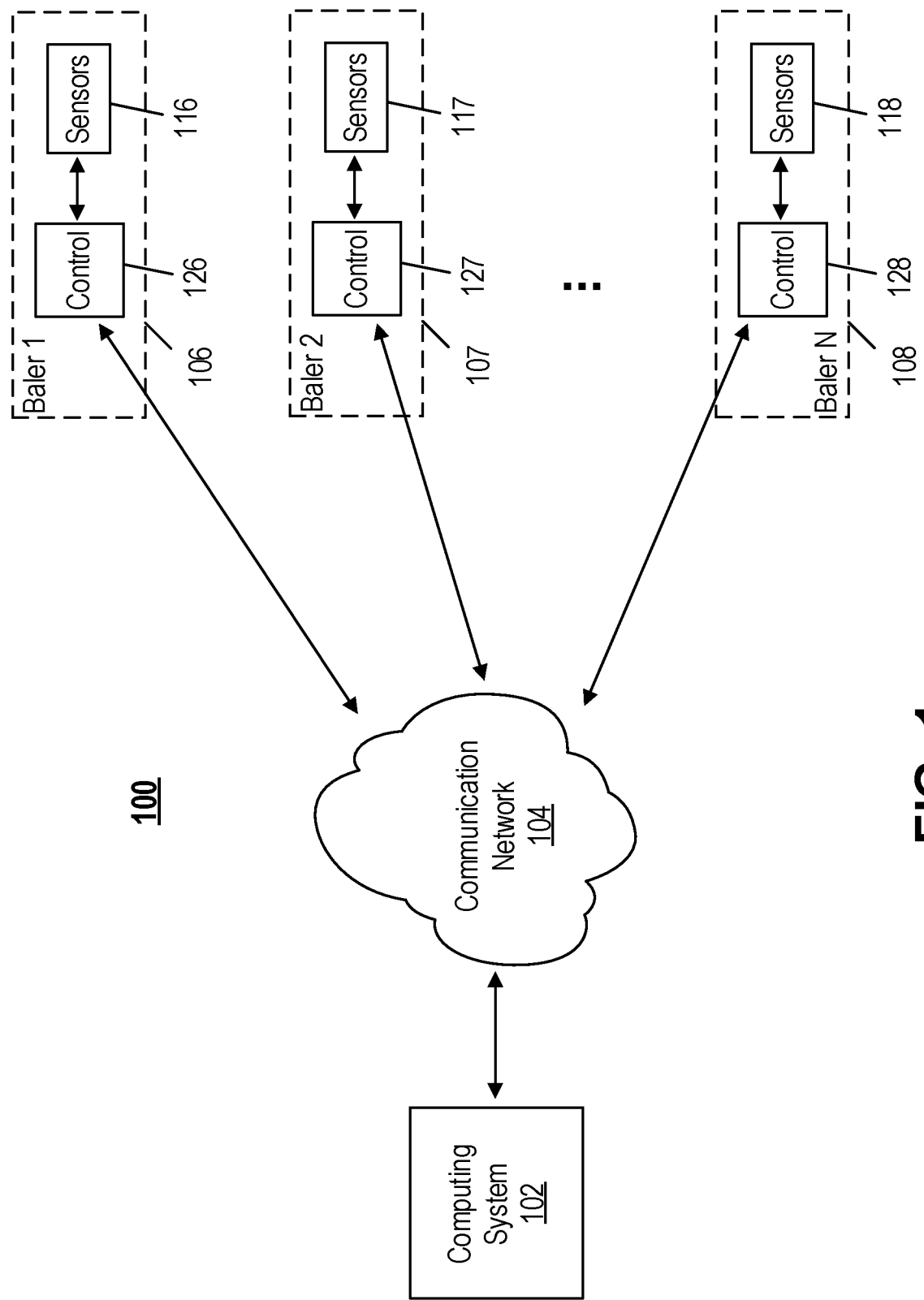
FIG. 1 illustrates an example network of balers with each baler having sensors and a controller that communicates with an external computing system through a communication network, in accordance with some embodiments of the present disclosure.

FIG. 1 illustrates network 100 including at least one computing system (e.g., see computing system 102), a communication network 104, and balers, e.g., see balers 106, 107, and 108. As shown, a baler of the network 100 includes sensors (e.g., see sensors 116, 117, and 118) and a controller (e.g., see controllers 126, 127, and 128). Also, in some embodiments, a tractor or another type of towing vehicle attached to a baler of the network 100 includes a computing system or controller similar to the controller of a baler. A controller or computing system of the network 100 or a sensor of the network (e.g., see controllers 126, 127, and 128 and sensors 116, 117, and 118) is configured to communicate with an external computing system (e.g., see computing system 102) through a communication network (e.g., see communication network 104). Also, in some embodiments, the controllers of the balers of the network 100 include a processor, memory, a communication interface and one or more sensors that make the balers individual computing devices. Also, in some examples, a tractor or accumulator attached to one of the balers is an individual computing device in the same way. In the case of the communication network 104 including the Internet, the balers 106, 107, and 108 are considered Internet of Things (IoT) devices. Also, a tactor or accumulator attached to one of the balers is considered an IoT device if it includes a computing system that connects to the Internet.

The network 100 includes various types of sensors (e.g., see sensors 116, 117, and 118). The sensors include position sensors, linear displacement sensors, angular displacement sensors, pressure sensors, load cells, or any other sensor useable to sense a metric proportional to a force exerted by hay or other crop on a rotor floor of a crop pickup portion of a baler or exerted by a forming bale on compression belts of a baling chamber of the baler and thus a tension arm of the baler, or any combination thereof.

The communication network 104 includes one or more local area networks (LAN(s)) or one or more wide area networks (WAN(s)). In some embodiments, the communication network 104 includes the Internet or any other type of interconnected communications network. In some embodiments, the communication network 104 includes a single computer network or a telecommunications network. In some embodiments, the communication network 104 includes a local area network (LAN) such as a private computer network that connects computers in small physical areas, a wide area network (WAN) to connect computers located in different geographical locations, or a middle area network (MAN) to connect computers in a geographic area larger than that covered by a large LAN but smaller than the area covered by a WAN.

As shown, at least each shown component of the network 100 (including computing system 102, communication network 104, and balers 106, 107, and 108) is or includes or is connected to a computing system that includes memory that includes media. The media includes or is volatile memory components, non-volatile memory components, or a combination of thereof. In general, each of the computing systems includes a host system that uses memory. For example, the host system writes data to the memory and reads data from the memory. The host system is a computing device that includes a memory and a data processing device. The host system includes or is coupled to the memory so that the host system reads data from or writes data to the memory. The host system is coupled to the memory via a physical host interface. The physical host interface provides an interface for passing control, address, data, and other signals between the memory and the host system.

Figure 2:
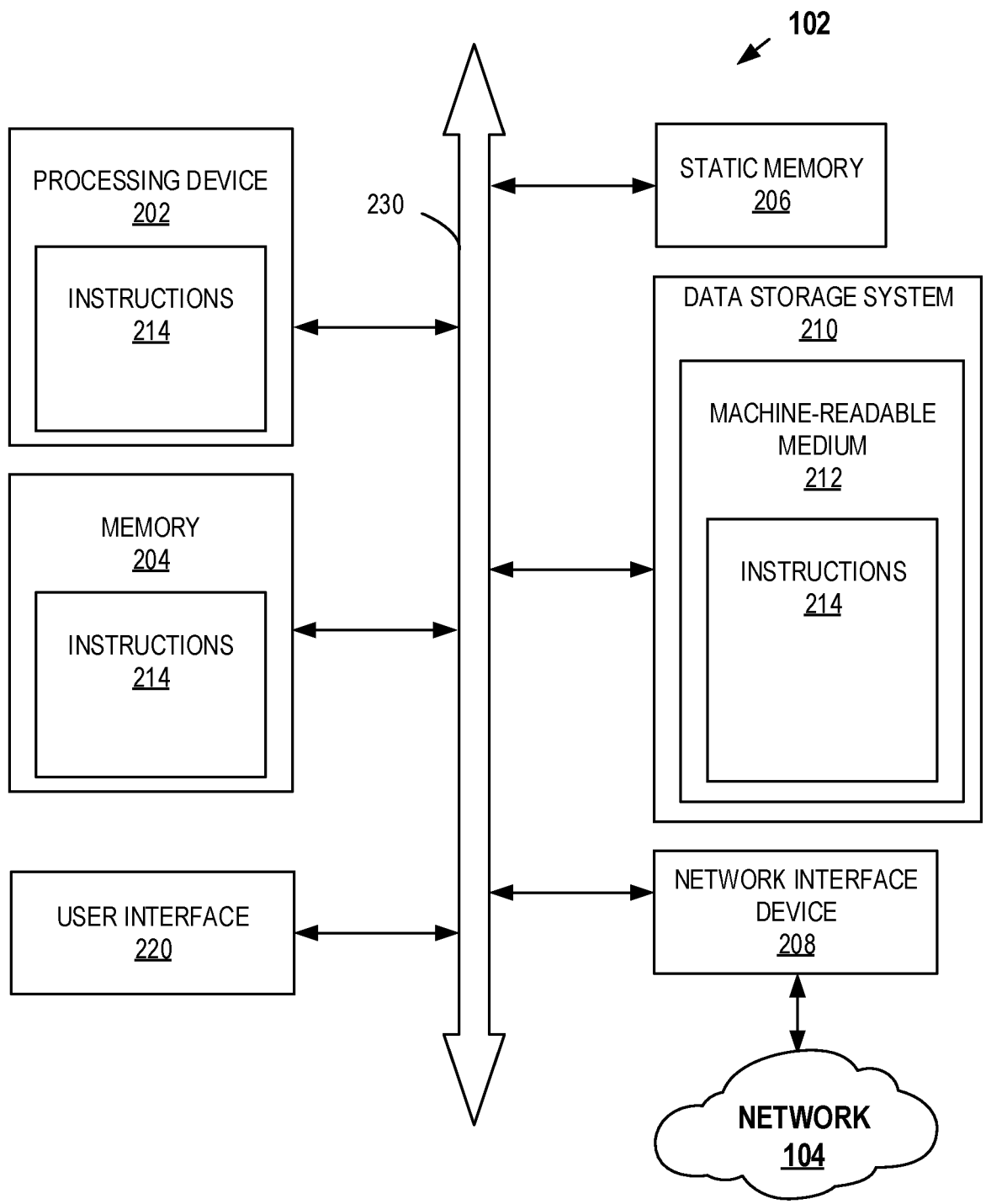
FIG. 2 illustrates a block diagram of example aspects of the external computing system shown in FIG. 1, in accordance with some embodiments of the present disclosure.

FIG. 2 shows a block diagram of example aspects of the computing system 102. FIG. 2 illustrates parts of the computing system 102 within which a set of instructions, for causing the machine to perform any one or more of the methodologies discussed herein, are executed. In some embodiments, the computing system 102 corresponds to a host system that includes, is coupled to, or utilizes memory or is used to perform the operations performed by any one of the computing devices, data processors, user interface devices, and sensors described herein. In alternative embodiments, the machine is connected (e.g., networked) to other machines in a LAN, an intranet, an extranet, or the Internet. In some embodiments, the machine operates in the capacity of a server or a client machine in client-server network environment, as a peer machine in a peer-to-peer (or distributed) network environment, or as a server or a client machine in a cloud computing infrastructure or environment. In some embodiments, the machine is a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computing system 102 includes a processing device 202, a main memory 204 (e.g., read-only memory (ROM), flash memory, dynamic random-access memory (DRAM), etc.), a static memory 206 (e.g., flash memory, static random-access memory (SRAM), etc.), and a data storage system 210, which communicate with each other via a bus 230.

The processing device 202 represents one or more general-purpose processing devices such as a microprocessor, a central processing unit, or the like. More particularly, the processing device is a microprocessor or a processor implementing other instruction sets, or processors implementing a combination of instruction sets. Or, the processing device 202 is one or more special-purpose processing devices such as an application specific integrated circuit (ASIC), a field programmable gate array (FPGA), a digital signal processor (DSP), network processor, or the like. The processing device 202 is configured to execute instructions 214 for performing the operations discussed herein. In some embodiments, the computing system 102 includes a network interface device 208 to communicate over the communication network 104 shown in FIG. 1.

The data storage system 210 includes a machine-readable storage medium 212 (also known as a computer-readable medium) on which is stored one or more sets of instructions 214 or software embodying any one or more of the methodologies or functions described herein. The instructions 214 also reside, completely or at least partially, within the main memory 204 or within the processing device 202 during execution thereof by the computing system 102, the main memory 204 and the processing device 202 also constituting machine-readable storage media.

In some embodiments, the instructions 214 include instructions to implement functionality corresponding to any one of the computing devices, data processors, user interface devices, I/O devices, and sensors described herein. While the machine-readable storage medium 212 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium"

shall accordingly be taken to include, but not be limited to, solid-state memories, optical media, and magnetic media.

Also, as shown, computing system 102 includes user interface 220 that includes a display, in some embodiments, and, for example, implements functionality corresponding to any one of the user interface devices disclosed herein. A user interface, such as user interface 220, or a user interface device described herein includes any space or equipment where interactions between humans and machines occur. A user interface described herein allows operation and control of the machine from a human user, while the machine simultaneously provides feedback information to the user. Examples of a user interface (UI), or user interface device include the interactive aspects of computer operating systems (such as graphical user interfaces), machinery operator controls, and process controls. A UI described herein includes one or more layers, including a human-machine interface (HMI) that interfaces machines with physical input hardware such as keyboards, mice, or pads, and output hardware such as monitors, speakers, and printers. In some embodiments, such a UI also includes a device that implements an HMI—also known as a human interface device (HID). In some examples, UI described herein include tactile UI (touch), visual UI (sight), auditory UI (sound), olfactory UI (smell), or gustatory UI (taste). In some embodiments, UI include composite user interfaces (CUIs), which are UIs that interact with two or more human senses. In some embodiments, a graphical user interface (GUI), which is composed of a tactile UI and a visual UI capable of displaying graphics, or any other type of UI presents information to a user of the system related to systems and methods for monitoring mat thickness and bale growth rate in a baler and using the monitored mat thickness and bale growth rate as control system inputs for operations of the baler, such as using the inputs for controlling ground speed of the baler. In some embodiments, sound is added to a GUI, such that the UI is a multimedia user interface (MUI) that provides information related to systems and methods for monitoring mat thickness and bale growth rate in a baler and using the monitored mat thickness and bale growth rate as control system inputs for operations of the baler, such as using the inputs for controlling ground speed of the baler. UI described herein also include virtual reality or augmented reality aspects, in some examples.

Figure 3:
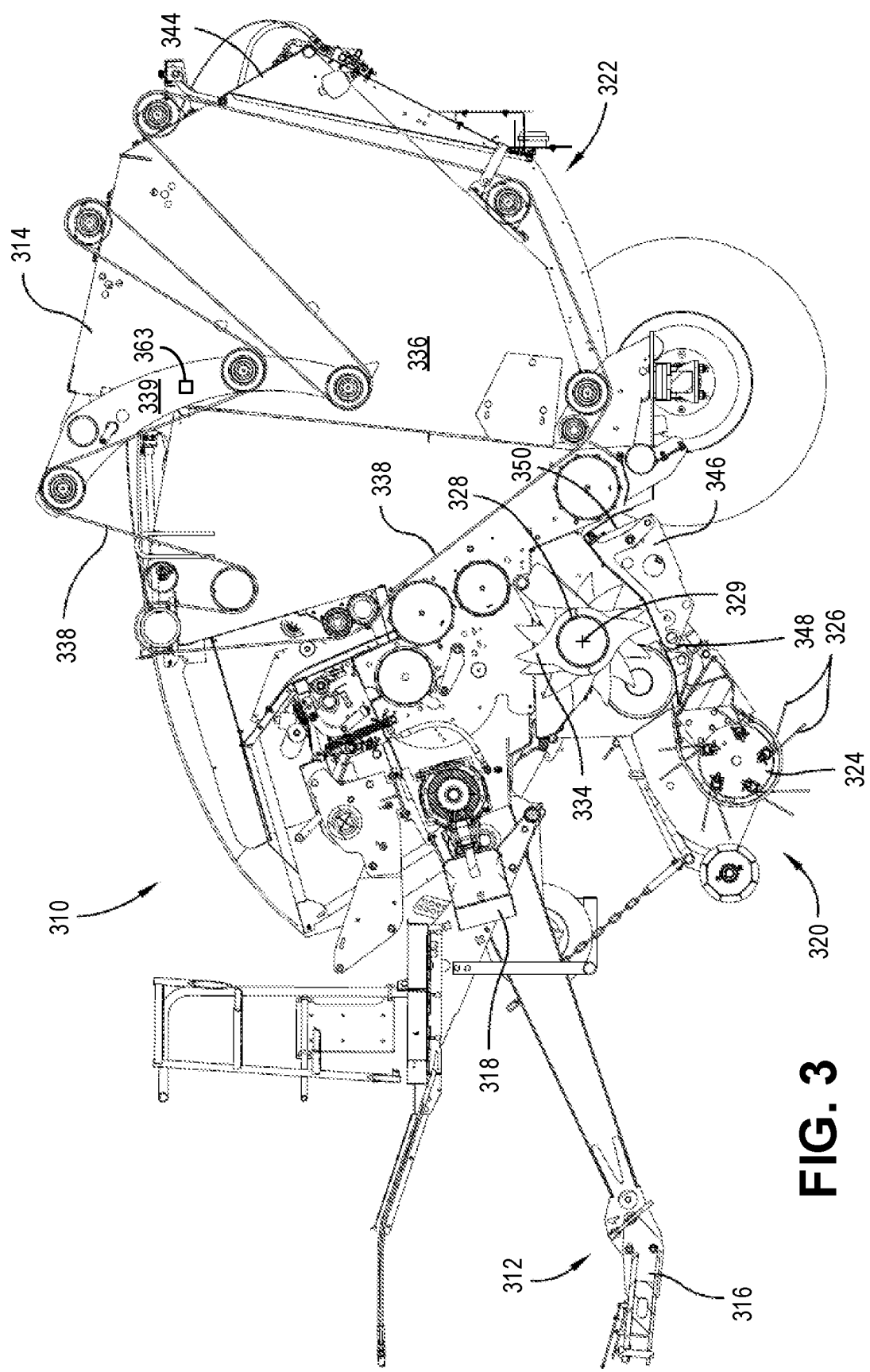
FIG. 3 illustrates a schematic side view of one of the balers shown in FIG. 1, with some portions of the baler being broken away to reveal some internal details of construction, in accordance with some embodiments of the present disclosure.
Figure 4:
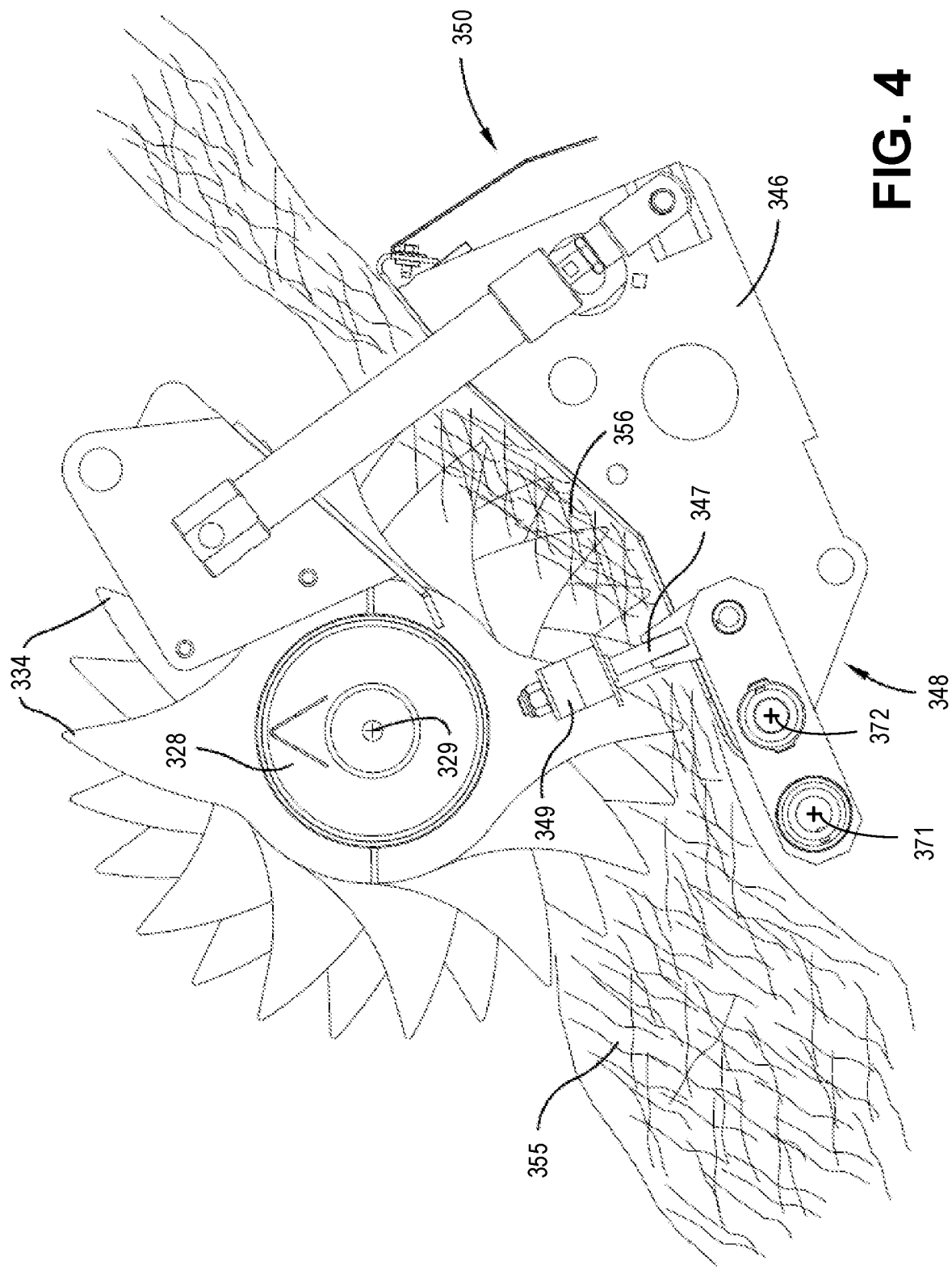
FIGS. 4 and 5 illustrate different schematic side views of parts of the baler shown in FIG. 3, with some portions of the baler being broken away to reveal some internal details of construction, in accordance with some embodiments of the present disclosure.
Figure 5:
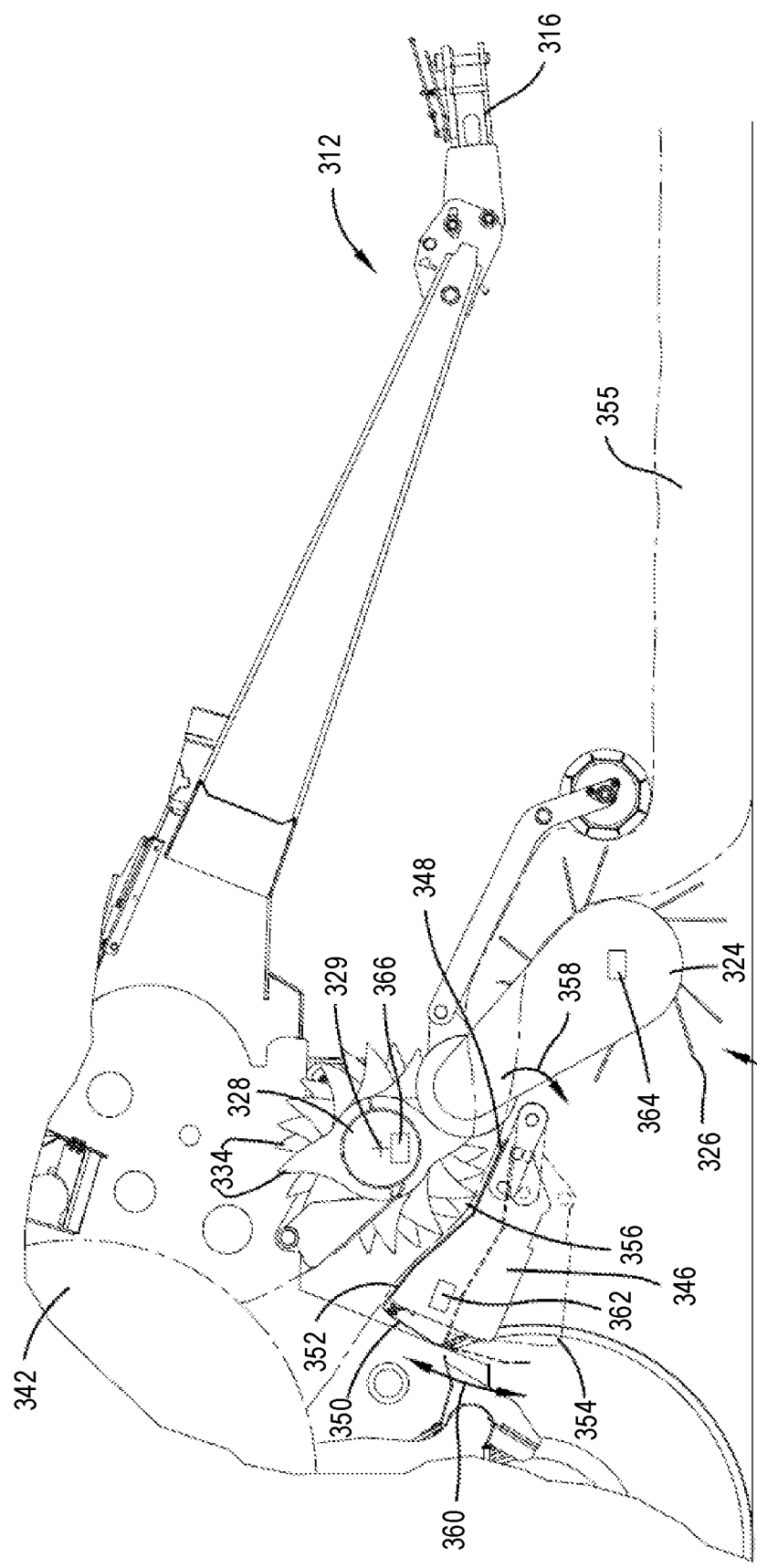

FIG. 3 illustrates a schematic side view of a baler 310, such as one of the balers shown in FIG. 1, with some portions of the baler being broken away to reveal some internal details of construction. FIGS. 4 and 5 illustrate different schematic side views of parts of the baler 310, with some portions of the baler being broken away to reveal some internal details of construction.

The baler 310 includes a towing and driveline portion 312 extending from a main body 314. The towing and driveline portion 312 includes a tow hitch 316 configured to be connected to a towing vehicle such as a tractor or the like during operation, such that the baler is pulled in a forward direction along a windrow of dried hay or similar crop lying in a field. The towing and driveline portion 312 also includes driveline connections 318 for operably connecting the drivable features of the baler 310 (e.g., the pickups, rotor, baling mechanism, etc.) to a power take-off (PTO) portion of the towing vehicle.

The main body 314 includes a crop pickup portion 320 and a baling portion 322. During operation, the crop pickup portion 320 engages the cut hay or other crop lying in a field and conveys it upward and rearward towards the baling portion 322. The baling portion 322 in turn compresses the hay into a shape (in the case of baler 310, which is a round baler, into a cylindrical bale), wraps the bale, and ejects the bale into the field for later retrieval.

The crop pickup portion 320 (shown in greater detail in FIG. 5) includes a rotary rake 324 that engages the hay or other crop in a windrow. The rotary rake 324 includes a plurality of spinning tines 326 that contact the hay or other crop as the baler 310 is towed forward and flings the hay or other crop upwards and rearwards toward the baling portion 322. The crop pickup portion 320 includes a rotor 328 that is configured to stuff the hay or other crop into the baling portion 322. In some embodiments, the crop pickup portion 320 includes one or more augers operably coupled to the rotor 328 and sandwiching a plurality of stuffers 334 or else provided upstream of the rotor 328. When the hay or other crop leaves the rotary rake 324, the augers center the hay and the spinning stuffers 334 of the rotor 328 pack the hay into the baling portion 322.

The baling portion 322 (shown in greater detail in FIG. 3) includes a baling chamber 336, a plurality of compression belts 338, and a wrapping mechanism. The rotor 328 stuffs the hay or other crop into the baling chamber 336, and more particularly into the compression belts 338 provided in the baling chamber 336. The rotating compression belts 338 continuously roll the hay or other crop and apply pressure thereto, therefore compacting the hay or other into a densely packed bale. The compression belts 338 are expandable via a tension arm 339 such that as more and more hay or other crop enters the baling chamber 336, the circumference of the portion of the compression belts 338 pressing on the bale 342 expands as the outer circumference of the bale 342 expands with the addition of more hay or other crop 355 being added to the bale 342 (e.g., see FIG. 5). Once a selected size of the bale 342 is achieved, the wrapping mechanism wraps the outer circumference of the bale 342 in plastic, netting, or another type of wrap. Finally, a movable tailgate 344 of the baler 310 swings open and the wrapped bale 342 is ejected into the field for later collection.

Some embodiments are directed to a material throughput sensing system incorporated into agricultural equipment such as the baler 310 shown in FIGS. 3 to 5, which senses a force exerted on portions of the crop pickup portion 320 and correlates the force to a rate of hay or other crop entering the baling portion 322 of the baler 310, which in turn is useable to be correlated to mat thickness or bale growth rate in the baler such that the monitored mat thickness or bale growth rate is useable as control system inputs for operations of the baler, such as using the inputs for controlling ground speed of the baler. In some embodiments, the sensing system or a second sensing system incorporated into agricultural equipment such as the baler 310 senses a force exerted on portions of the baling portion 322 and correlates the force to mat thickness or bale growth rate in the baler such that the monitored mat thickness or bale growth rate is useable as control system inputs for operations of the baler, such as using the inputs for controlling ground speed of the baler.

In some embodiments, the crop pickup portion 320 includes a rotor floor 346, which is movable, directly beneath the rotor 328, as shown in FIGS. 3 to 5. The rotor floor 346 increases a cross-sectional area of an inlet to the baling chamber 336 in an effort prevent the inlet of the baling chamber 336 from becoming blocked. The rotor floor 346 reduces the risk of blockage by incorporating a suspension unit that allows the rotor floor 346 to translate or rotate with respect to a rotational axis 329 of the rotor 328 thereby altering a passageway between the rotor 328 and the rotor floor 346 during use. In some embodiments, the suspension unit includes one or more suspension members 347, which, in some embodiments, includes rubber bushings or the like that permit the rotor floor 346 to translate or rotate as a cut crop is fed through the crop pickup portion 320 and thus exerts a force on the rotor floor 346. The rotor floor 346 also includes one or more biasing members 349 that bias the floor towards the rotor 328 and thus causes the floor to abut the rotor when no force is applied thereto.

In some embodiments, the rotor floor 346 pivots about rotational axis 371 and rotational axis 372 and the one or more biasing members 349 is a flexible or movable member (e.g., see FIG. 4). In such embodiments, the rotor floor 346 is a flex pivot floor.

In some other embodiments, the rotor floor 346 pivots about rotational axis 371 only, and in such embodiments the one or more biasing members 349 is not a part of the baler 310. In such embodiments, the rotor floor 346 is a fixed pivot floor.

In some embodiments, the sensing system or a second sensing system incorporated into agricultural equipment such as the baler 310 senses a force exerted on the rotor floor 346 and correlates the force to mat thickness or bale growth rate in the baler such that the monitored mat thickness or bale growth rate is useable as control system inputs for operations of the baler, such as using the inputs for controlling ground speed of the baler.

When no force or relatively little force is applied to the rotor floor 346, the floor is in a first position 352 where it generally abuts the rotor 328 (e.g., see FIG. 5). However, as the force acting on the rotor floor 346 increases, the acting force counteracts the biasing force thus moving the rotor floor downward and away from the rotor 328 to a second position 354 (e.g., see FIG. 5). It should be appreciated that the first and second positions 352, 354 are illustrative only and in practice there will be infinite positions for the rotor floor 346 to occupy rotates or translates during operation. In some embodiments, the sensing system or a second sensing system incorporated into agricultural equipment such as the baler 310 senses a position or movement or a related pressure of the rotor floor 346 or the rotor 328 or any other part of the baler 310 and correlates the position or movement or the related pressure to mat thickness or bale growth rate in the baler such that the monitored mat thickness or bale growth rate is useable as control system inputs for operations of the baler, such as using the inputs for controlling ground speed of the baler.

For example, the tension arm 339, is configured to support adjustment or expansion of the perimeter of the compression belts 338, and in some embodiments, operable to expand or contract the perimeter formed by the compression belts. In some embodiments, the perimeter formed by the compression belts is a structure and mechanism for holding and forming the bale by exerting tension on outer portions of the bale. In some embodiments, the sensing system or a second sensing system incorporated into agricultural equipment such as the baler 310 senses a position or movement or a related pressure of the tension arm 339 and correlates the position or movement or the related pressure to mat thickness or bale growth rate in the baler such that the monitored mat thickness or bale growth rate is useable as control system inputs for operations of the baler, such as using the inputs for controlling ground speed of the baler.

Aspects of different parts of the baler 310, such as sensors and a controller, measure force, pressure, movement, or position related to the rotor 328, the rotor floor 346, the tension arm 339, or any other moving part of the crop pickup portion 320 and the baling portion 322 of the baler 310, such as force acting upon the rotor floor 346 or the displacement of the rotor floor 346 as an indication of how much hay or other crop is entering the baler 310 and thus the baling chamber 336 as well as an indication of mat thickness or bale growth rate in the baler. For example, how much hay or other crop is entering the baler 310 is useable to determined mat thickness or bale growth rate in the baler 310.

For example, as the baler 310 is towed in a forward direction (i.e., to the right as viewed in FIG. 5), the crop pickup portion 320 engages hay or other crop 355 lying in a windrow and conveys it towards the baling portion 322 via the rotor 328. In this regard, the hay or other crop 355 is forced between the rotor 328 and the rotor floor 346 at an impingement portion 356. Due to the compression of the hay or other crop 355 between the rotor 328 and the rotor floor 346 at the impingement portion 356, the hay or other crop 355 exerts a force on the rotor floor 346 causing it to displace. More particularly, the rotor floor 346 angularly displaces (as indicated by arrow 358), or linearly displaces (as indicated by arrow 360). The force exerted on the rotor floor 346, the angular displacement of the rotor floor 346, or the linear displacement of the rotor floor 346, or a combination thereof is measurable to determine a rate of hay entering the baler 310 and thus the baling chamber 336 as well as to determine mat thickness or bale growth rate in the baler 310. In some embodiments, the speed of a portion of the crop pickup portion 320, such as an angular velocity of the rotary rake 324 or the rotor 328, is also used when determining the rate of hay entering the baler 310 and thus the baling chamber 336 as well as to determine mat thickness or bale growth rate in the baler.

Analogously, for example, as the baler 310 is towed in a forward direction, the tension arm 339 supports expansion of the compression belts 338 as the belts engage hay or other crop 355 as the hay or crop passes into the baling chamber 336 to be formed into a bale 342. As the baler 310 moves in a forward direction and the bale 342 expands, the compression belts 338 expand with the expanding bale 342 and the tension arm 339 moves with the compression belts 338 to support the expansion of the belts. In this regard, an expanding bale (e.g., see bale 342) exerts a force upon the compression belts 338 and as a consequence of the exerted force the compression belts 338 exert a force upon the tension arm 339. In some embodiments, the tension arm 339 exerts an additional counter force on the compression belts 338 and thus an additional counter force or tension on the bale forming in the baling chamber of the baler 310. One or more of such exerted forces angularly or linearly displaces the tension arm 339. The angular displacement, the linear displacement, or a combination thereof is measurable to determine a rate of hay entering the baler 310 and thus the baling chamber 336 as well as to determine mat thickness or bale growth rate in the baler 310.

In some embodiments, the force exerted on the rotor floor 346 or the tension arm 339 or the displacement of the rotor floor 346 or the tension arm 339 are determined using a sensor 362 operatively connected to the rotor floor 346 or the tension arm 339, respectively. For example, in some embodiments, the sensor 362 or the sensor 363 is an angular displacement sensor that measures the angular displacement of the rotor floor 346 or the tension arm 339 about a pivot axis, respectively. In some embodiments, the sensor 362 or the sensor 363 is located near an end of the rotor floor 346 or the tension arm 339 opposing the pivot axis, respectively (e.g., see first end 348 of the rotor floor 346). In other embodiments, the sensor 362 or the sensor 363 is a linear displacement sensor that measures the linear displacement of the rotor floor 346 or the tension arm 339 at a given point of the rotor floor 346 or the tension arm 339, respectively (e.g., see a point near a second end 350 of the rotor floor 346). In other embodiments, the sensor 362 or the sensor 363 is a pressure sensor that measures a pressure exerted by the hay or other crop 355 on the rotor floor 346 or a pressure exerted by a forming bale on the compression belts 338 and thus the tension arm 339, respectively. And, in other embodiments, the sensor 362 or the sensor 363 is a load cell that measures a load exerted by the hay or other crop 355 on the rotor floor 346 or a load exerted buy a bale on the compression belts 338 and thus the tension arm 339, respectively. Also, any other appropriate sensor is useable to sense a metric proportional to a force exerted by the hay or other crop 355 on the rotor floor 346 or exerted by a forming bale on the compression belts 338 and thus the tension arm 339. Moreover, for embodiments where the metric is measured without relative movement of the rotor floor 346 or the tension arm 339 or another part of the baler 310 (e.g., when the sensor 362 or 363 is a pressure sensor, load cell, or similar sensor), the monitored part of the baler may be stationary. Also, in some embodiments, the rotational speed of a spinning part of the baler is measured using an appropriate sensor. For example, the rotational speed of the rotary rake 324 is measurable using a first speed sensor 364, or the rotational speed of the rotor 328 is measurable using a second speed sensor 366.

In some embodiments, the information indicative of the rate of hay or other crop 355 entering the baler 310 or other piece of equipment—more particularly, the information regarding the rotational speed of the rotary rake 324 or rotor 328 (referred to herein as "speed data") together with the force, pressure, or displacement data associated with the rotor floor 346 or the tension arm 339 or another part of the baler 310 (referred to herein as "force data") is useable to a tow vehicle or an operator of a tow vehicle in real-time. This aids the operator or the tow vehicle in making speed or other decisions when baling hay or otherwise picking up a crop. For example, in some embodiments, the real-time data is provided to the operator or another party for real-time monitoring of how much hay is being produced, the mat thickness, or the bale growth rate. In some examples, by monitoring the speed of a portion of the crop pickup portion 320 with the first speed sensor 364 or the second speed sensor 366 or the physical attributes of the baler 310 associated with the force data, the throughput rate of the hay or other crop 355 being picked up from the field or the mat thickness or the bale growth rate or a combination thereof is provided to the tow vehicle or to the operator of the tow vehicle (via a user interface on-board the tow vehicle) and necessary adjustments to speed of the vehicle or the PTO is made until a more efficient take-up rate or mat thickness or bale growth rate is achieved.

In some embodiments, adjustments to drive speed, PTO speed, or other parameter of the tow vehicle or the baler 310 is performed autonomously in response to the monitored take-up rate or mat thickness or bale growth rate or a combination thereof. For example, certain balers or tow vehicles, such as tractors, are outfitted with a universal Tractor Implement Management (TIM) system or an ISOBUS-compatible system. In such embodiments, an implement (such as the baler 310) takes control of the tow vehicle in some respects. More particularly, TIM systems similar employ the international ISOBUS standard that enables controllers of implements (e.g., the baler 310) and the tow vehicle (e.g., a tractor) to communicate and control one another. As should be appreciated by one skilled in the art, TIM systems reduce the amount of repetitive actions that must be traditionally performed by an operator of the tractor. As one example, when baling hay traditionally operators must stop the tractor each time the baling chamber is full to allow the baler to wrap and eject the fully formed hay bale. In balers equipped with TIM, the baler autonomously (e.g., without input from the operator) reduces the tractor's speed or stop the tractor when the bale is fully formed, and thereafter increase the tractor's speed once the hay bale has been ejected.

In some embodiments, when agricultural equipment is equipped with a TIM system or an ISOBUS-compatible system, the TIM system or ISOBUS-compatible system increases the tractor driving speed or the rotation speed of the PTO when the sensor data indicates that the hay take-up rate, the mat thickness, or bale growth rate, or a combination thereof is less than a selected amount. Conversely, the TIM system or the ISOBUS-compatible system decreases the tractor driving speed or the rotation speed of the PTO when the sensor data indicates that the hay take-up rate is higher than a selected amount.

Also, in some embodiments, the information indicative of the rate of hay or other crop 355 entering the baler or other piece of equipment, or the monitored take-up rate or the information indicative of mat thickness or bale growth rate, or a combination thereof, is stored via on on-board memory or the like for later transmission to a farm management information system (FMIS) or similar software package. In other embodiments, the data is wirelessly transmitted to a remote personal computer, server, or other suitable device for later review and use by the grower using the FMIS or similar. For example, the sensor data is used to create a yield map or other graphical display, providing the grower with agronomic data for making future planting or treatment decisions for a given field.

Figure 6:
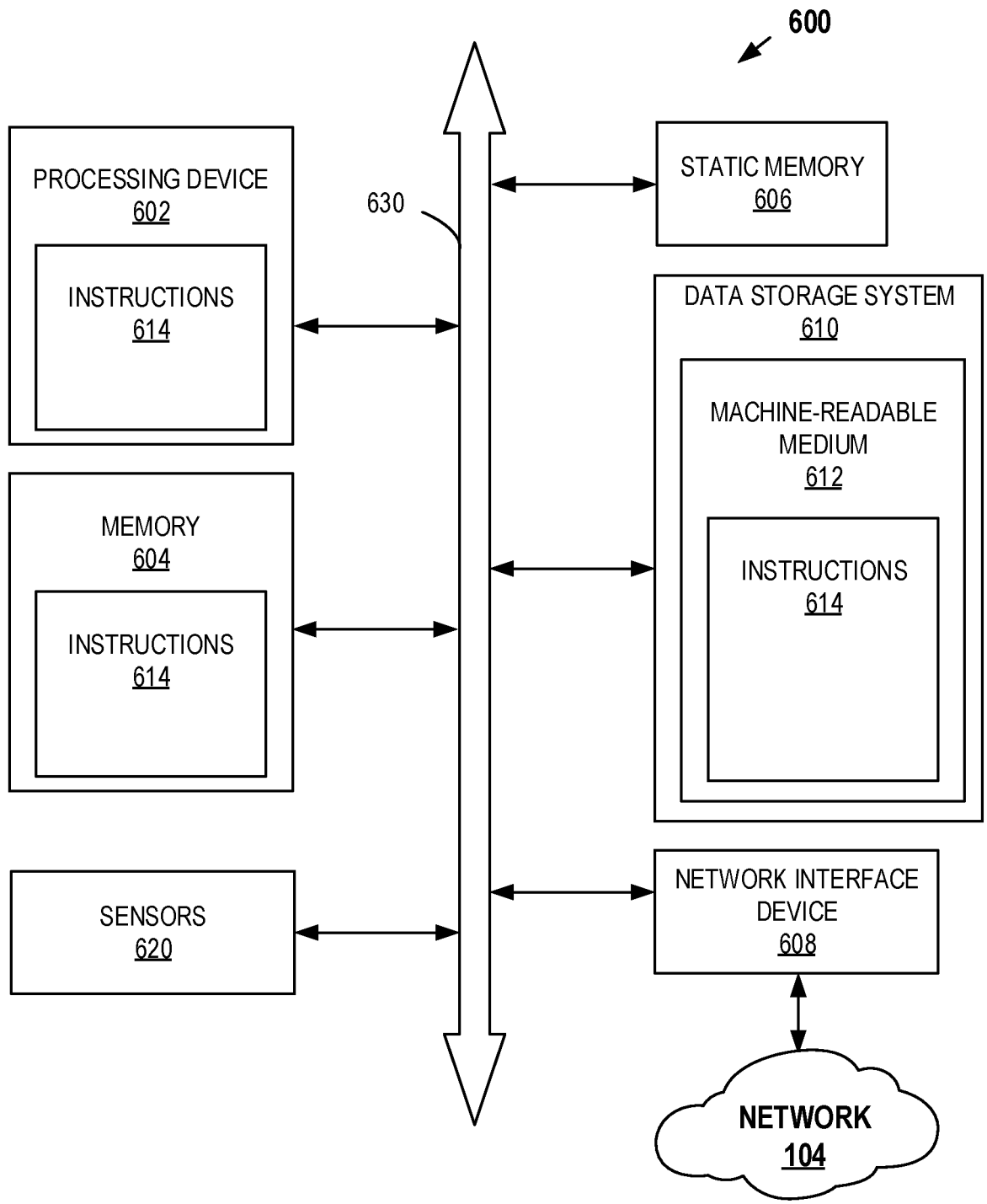
FIG. 6 illustrates a block diagram of example aspects of an example computing system that are a part of a baler (such as the baler shown in FIG. 3), in accordance with some embodiments of the present disclosure.

The above described methods and systems are more readily understood with reference to FIGS. 1 to 2 and 6 to 13, which schematically depict methods and systems related to collecting data using a sensing and control system including one or more sensors, such as sensors 116, 117, 118, 362, 363, 364, 366, and 620 (shown in FIG. 6), using data collected by the sensors to make a decision regarding towing vehicle speed, PTO speed, planting, treatment, and other decisions by the control system and associated computing systems, such as computing system 102 and 600 (shown in FIG. 6).

FIG. 6 illustrates is a block diagram of example aspects of computing system 600 that is a part of a baler (such as one of balers 106, 107, 108, or 310). FIG. 6 illustrates parts of the computing system 600 within which a set of instructions, for causing a machine to perform any one or more of the methodologies discussed herein, are executable. In some embodiments, the computing system 600 corresponds to a host system that includes, is coupled to, or utilizes memory or is used to perform the operations performed by any one of the computing devices, data processors, user interface devices, and sensors described herein. In alternative embodiments, the machine is connected (e.g., networked) to other machines in a local area network (LAN), an intranet, an extranet, or the Internet. In some embodiments, the machine operates in the capacity of a server or a client machine in client-server network environment, as a peer machine in a peer-to-peer (or distributed) network environment, or as a server or a client machine in a cloud computing infrastructure or environment. In some embodiments, the machine is a PC, a tablet PC, a STB, a PDA, a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computing system 600 includes a processing device 602, a main memory 604 (e.g., read-only memory, flash memory, DRAM, etc.), a static memory 606 (e.g., flash memory, SRAM, etc.), and a data storage system 610, which communicate with each other via a bus 630.

The processing device 602 represents one or more general-purpose processing devices such as a microprocessor, a central processing unit, or the like. More particularly, in some embodiments, the processing device is a microprocessor or a processor implementing other instruction sets, or processors implementing a combination of instruction sets. Or, the processing device 602 is one or more special-purpose processing devices such as an ASIC, a FPGA, a DSP, network processor, or the like. The processing device 602 is configured to execute instructions 614 for performing the operations discussed herein. In some embodiments, the computing system 600 includes a network interface device 608 to communicate over the communication network 104 shown in FIG. 1.

The data storage system 610 includes a machine-readable storage medium 612 (also known as a computer-readable medium) on which is stored one or more sets of instructions 614 or software embodying any one or more of the methodologies or functions described herein. The instructions 614 also reside, completely or at least partially, within the main memory 604 or within the processing device 602 during execution thereof by the computing system 600, the main memory 604 and the processing device 602 also constituting machine-readable storage media.

In some embodiments, the instructions 614 include instructions to implement functionality corresponding to any one of the computing devices, data processors, user interface devices, I/O devices, and sensors described herein. While the machine-readable storage medium 612 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Also, as shown, computing system 600 includes sensors 620 that implement functionality corresponding to any one of the sensors disclosed herein (e.g., see sensors 116, 117, 118, 362, 363, 364, and 366). In some embodiments, the sensors 620 include a camera or another type of optical instrument. The sensors 620 are or include a device, a module, a machine, or a subsystem that detect objects, events or changes in its environment and send the information to other electronics or devices, such as a computer processor or a computing system in general. The sensors 620 or any sensor described herein includes a position sensor, a linear displacement sensor, an angular displacement sensor, a pressure sensor, a load cell, or any other sensor useable to sense a metric proportional to a force exerted by hay or other crop on a rotor floor of a crop pickup portion of a baler or exerted by a forming bale on compression belts of a baling chamber of the baler and thus a tension arm of the baler, or any combination thereof.

A system of the technologies described herein includes a controller of a baler (e.g., see controllers 126, 127, and 128 which, in some embodiments, are at least partially implemented via instructions such as instructions 614 of computing system 600). The system also includes one or more sensors of the baler connected to the controller (e.g., see sensors 116, 117, 118, 362, 363, 364, 366, and 620). In some embodiments, the combination of the sensor(s) and the controller perform the steps of the methods shown in FIGS. 7 to 9 and 11 to 13 and many other methods described herein.

In some embodiments, the controller is configured to monitor and identify one or more sensed attributes of the baler that are sensed by the sensor(s). For example, the controller is configured to monitor and identify an angular position or a pressure reading associated with a part of the baler (e.g., see the rotor 328, the rotor floor 346, or the tension arm 339 of the baler 310). The monitoring and identification of the attribute(s) occurs during operation of the baler (e.g., see method 700). Also, in some examples, the controller is configured to determine a derivative of a monitored attribute, which is a change or rate of change in the monitored attribute (e.g., see method 1100). Then, the monitored attribute(s) are used to determine a mat thickness generated by a baler or bale growth rate, and the derivative of the monitored attributes are used to determine a change or a rate of change in the mat thickness or bale growth rate over a period of operation of the baler.

For example, the controller monitors angular position of a tension arm of the baler (e.g., see tension arm 339) and determine derivatives of the angular position of the tension arm from corresponding angular position sensor data communicated from an angular position sensor (e.g., see sensor 363). The angular position sensor, which is one of the sensor(s), is position on or near the tension arm depending on the type of sensor and the embodiment. Then, the monitored angular position of the arm and the derivatives thereof is used to determine a mat thickness generated by the baler and determine a change or a rate of change in the mat thickness over a period of operation of the baler, respectively. Also, for example, the controller monitors a pressure reading associated with operation of the tension arm and determine derivatives thereof. For example, the pressure reading is communicated pressure switch data from a pressure switch. The pressure switch data is communicated from the pressure switch that is attached on or near the tension arm.

The monitored angular position and pressure readings associated with the tension arm are just some of the many sensed attributes that are used. In some embodiments, additional sensors are also connected to the controller to monitor other attributes of the operating baler and determine respective derivatives of the other attributes, and then in turn be used to determine yield through mat thickness calculations and derivatives of mat thickness. Also, bale growth rate and its derivatives are determined and used for control. For example, the controller is connected to an angular position sensor or a pressure sensor on or near any operable part of the baler such as a crop compression rack or wind guard (e.g., see crop pickup portion 320), a bale tension bar or rack (e.g., see tension arm 339—this is the arm connected to the compression belts which, in some examples, is attached to a pressure sensor that typically gives pressure readings ranging from 0 to 3600 psi or which is attached to an angular position sensor that provides data on displacement of the arm such as from 0 to 70 degrees), packer in the baling chamber (e.g., see baling chamber 336 and note that a packer is not depicted since a packer is typically a part of a square baler), a bale compression belt in the baling chamber (e.g., see compression belts 338), or a crop pickup portion or a pre-forming portion of the baler (e.g., see crop pickup portion 320, rotary rake 324 monitored by first speed sensor 364, rotor 328 monitored by second speed sensor 366, rotor floor 346 which, in some embodiments, is attached to a pressure sensor that typically gives pressure readings ranging from 0 to 200 psi, first and second ends 348 and 350 of rotor floor 346, one or more biasing members 349, one or more suspension members 347, an impingement portion 356, etc.). Also, for example, the controller is connected to an angular position sensor or a pressure sensor on or near any arm, actuator, rack, spring, floor, wall, or any combination thereof configured to provide crop gathering or support in formation of a bale, e.g., a part supporting or providing expanding and contracting of a perimeter of belts, racks, or bars in the formation of a bale in a baling chamber of a baler, wherein the perimeter is a structure and mechanism for holding and forming the bale by exerting tension on the outside of the bale.

Also, for example, the controller monitors propulsive or ground speed of the baler and determine derivatives of propulsive speed from accelerometer data. The accelerometer data is communicated from an accelerometer of the controller or a separate accelerometer on the baler and then be used to determine mat thickness and derivatives thereof or bale growth rate and derivatives thereof. Also, the controller monitors torque or displacement of a drive element of the baler (e.g., see driveline connections 318 of towing and driveline portion 312) and determine derivatives of such physical attributes of the drive element from sensor data. The sensor data is communicated from a sensor attached on or near the drive element, for example.

In some embodiments, the data received by the controller from the sensors is used by the controller to continuously determine derivatives of corresponding attributes of the operating baler as well as an approximate rate of change in a size of a bale or a bale mat thickness. The approximate rate of change in a size of a bale or a bale mat thickness is associated with the propulsive speed of the baler, pressure or displacement associated with an operable part of the baler (such as any one or more of the aforementioned operable parts), or torque or displacement of a drive element of the baler or a vehicle that tows the baler.

In some embodiments, the determined derivatives as well as the determined approximate rate of change in size of a bale or a bale mat thickness is be linked by the controller to one of a number of operating ranges (such as one of four difference operating ranges). The ranges or the data linked with the ranges is used by the controller as an indicator to the operator of bale throughput attributes. For example, the controller outputs to the operator, via a user interface (UI), a mat thickness or a bale growth rate of the baler (e.g., see FIGS. 8, 9, and 10). The output to the operator is provided in real time during operation of the baler, for example.

In an example four range system, one range includes the thinnest mat status or no mat size status, and a four includes the thickest mat status. A two and three category includes intermediate statuses of mat thickness. The ranges or categorized statuses, which have number values in the aforesaid embodiment, are determined by testing per crop type and quality (e.g., corn stalks versus grass stalks, freshly cut stalks versus sun-dried stalks, different levels of estimated moisture in hay, etc.). And, in some embodiments, such testing incorporates machine learning. Also, testing of bale growth rates varies by testing per crop type and quality. And, such testing incorporates machine learning as well, for example.

The information determined by the controller or a computing device of or communicatively coupled to the controller lets an operator of the baler or a towing vehicle pulling the baler know that he or she is driving too fast or too slowly (which is directly related to bale mat thickness and bale density as well as bale growth rate). The information possibly reduces baling time, give the operator more control over bale weight, and reduce the number of bales in a field. In consideration of the benefits of the system, it can be thought of as a mechanically based mass flow yield system that includes informational output that is displayed to a user via a UI to enhance operations of the baler manually or that is used as feedback information to the controller so that the controller automatically enhances operations of the baler with or without manual input depending on the embodiment. In some embodiments, the information collected by the system is also used to generate a yield map to give the operator a real-time throughput reading and save data for the work record of the operator (e.g., see FIGS. 9 and 10).

As mentioned, in some examples, the informational output is displayed to a user via a UI to enhance operations of the baler manually or is used as feedback information to the controller so that the controller automatically enhances operations of the baler with or without manual input depending on the embodiment.

Figure 8:
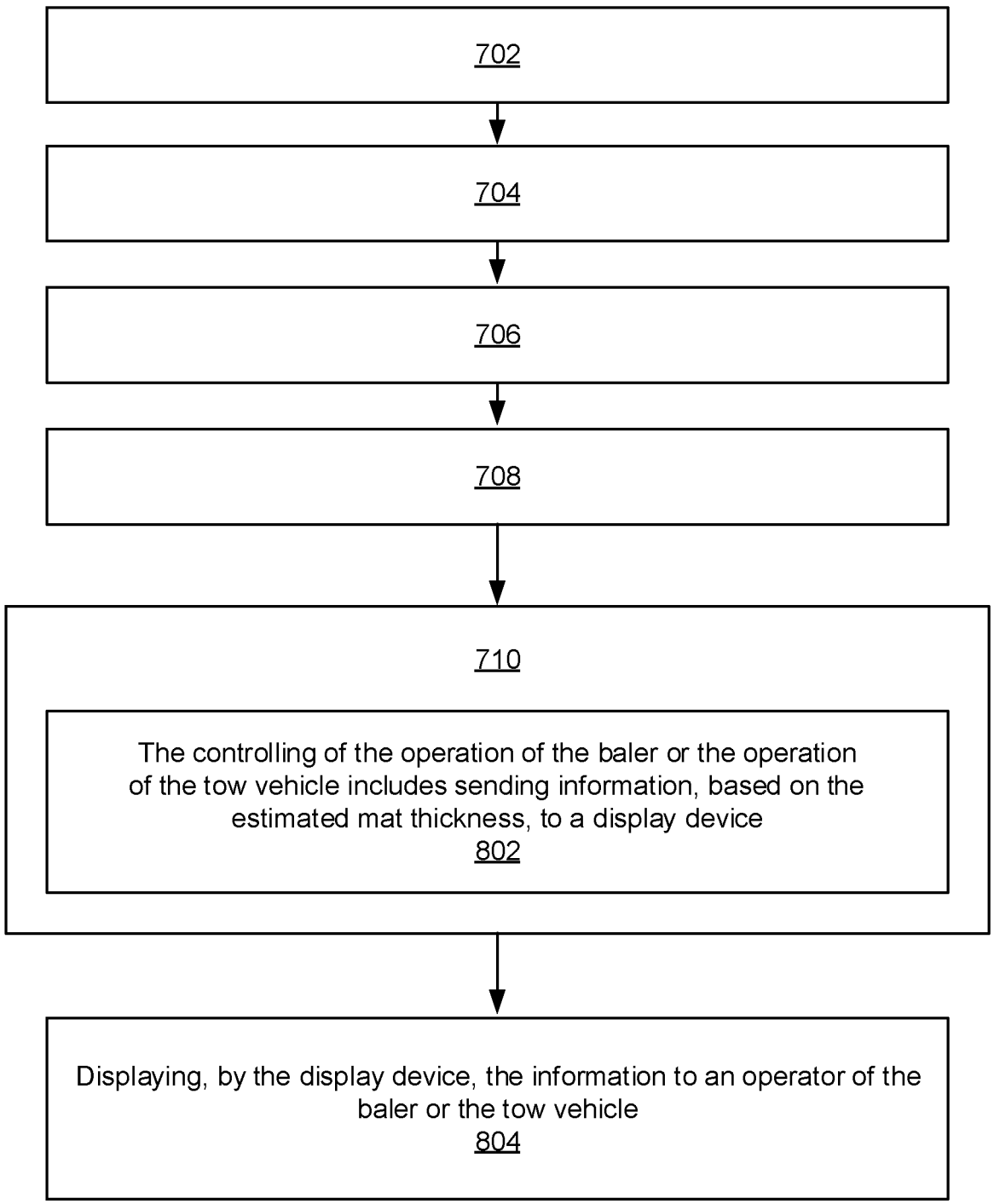
Figure 9:
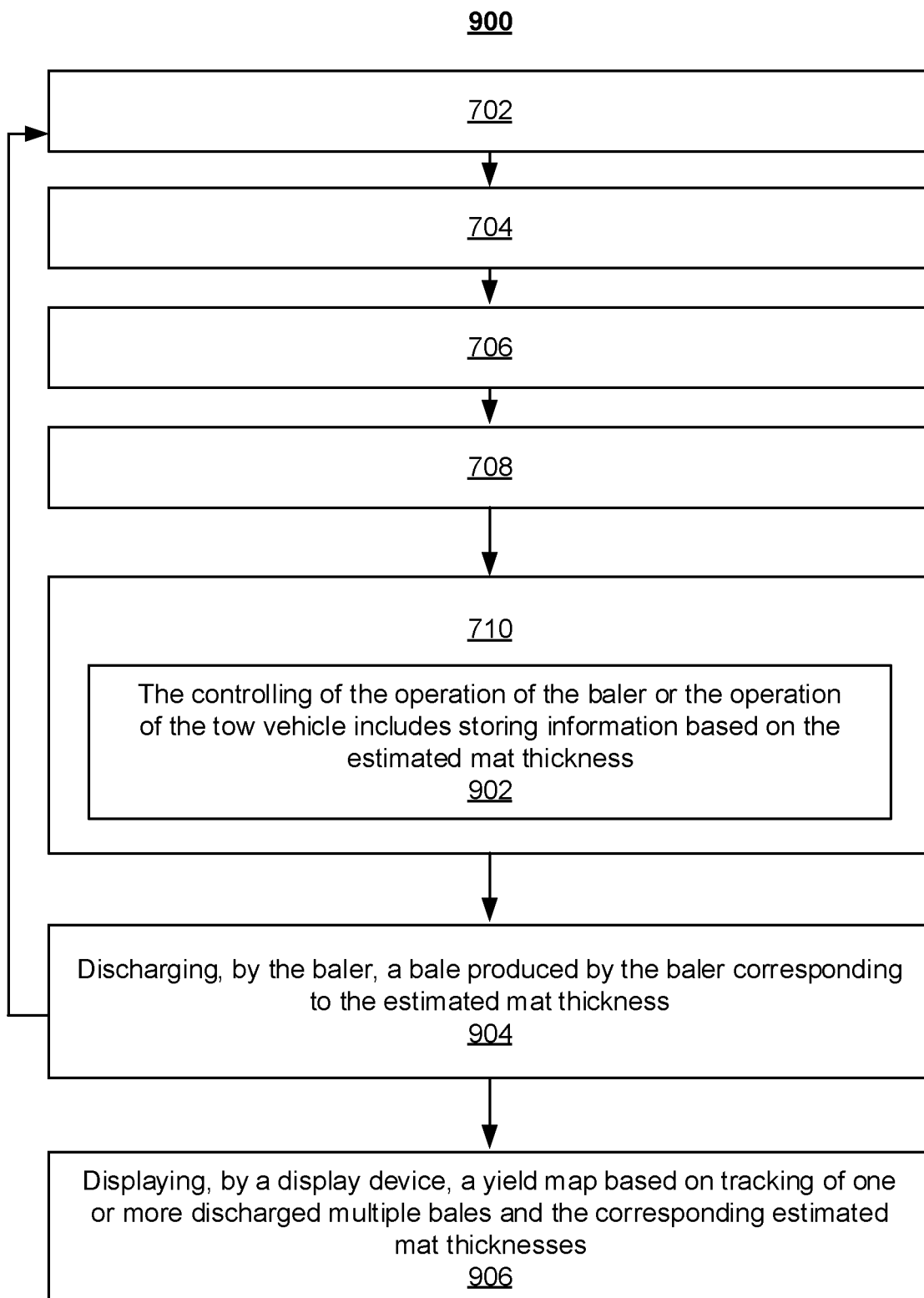

FIGS. 7, 8, and 9 illustrate methods 700, 800, and 900, respectively, in accordance with some embodiments of the present disclosure.

Method 700 starts with step 702, which includes sensing, by a sensor of a round baler (e.g., see sensors 116, 117, and 118, or sensors 620), a physical attribute associated with a moving part of the round baler while the round baler is operating in a crop field. Method 700 continues with step 704, which includes receiving from the sensor, by a controller of the round baler (e.g., see controllers 126, 127, and 128 or computing system 600), data corresponding to the sensed physical attribute. Method 700 then continues with step 706, which includes determining, by the controller, a value of the physical attribute based on the received data. Step 708 includes estimating, by the controller, a mat thickness generated by the round baler based on the determined value of the physical attribute. And, finally, step 710 includes controlling, by the controller, an operation of the baler or an operation of a tow vehicle, configured to tow the baler, based on the estimated mat thickness.

Method 800 includes steps 702, 704, 706, 708, and 710 of method 700. And, method 800 starts with step 702 and continues with steps 704, 706, 708, and 710. In step 710 of method 800, the method 800 continues with step 802 in which the controlling of the operation of the baler or the operation of the tow vehicle includes sending information, based on the estimated mat thickness, to a display device. And, the method 800 continues with step 804, which includes displaying, by the display device, the information to an operator of the baler or the tow vehicle.

Method 900 also includes steps 702, 704, 706, 708, and 710 of method 700. In method 900, the controlling of the operation of the baler or the operation of the tow vehicle, at step 710, includes storing information based on the estimated mat thickness (see step 902). At step 904, the method continues with discharging, by the baler, a bale produced by the baler corresponding to the estimated mat thickness. In method 900, steps 702, 704, 706, 708, and 710 of method 700 are repeated with each discharge of a bale from the baler at step 904. The method 900 also includes step 906, which includes displaying, by a display device (e.g., see display 1002), a yield map (e.g., see yield map 1004) based on tracking of one or more discharged multiple bales and the corresponding estimated mat thicknesses.

Figure 10:
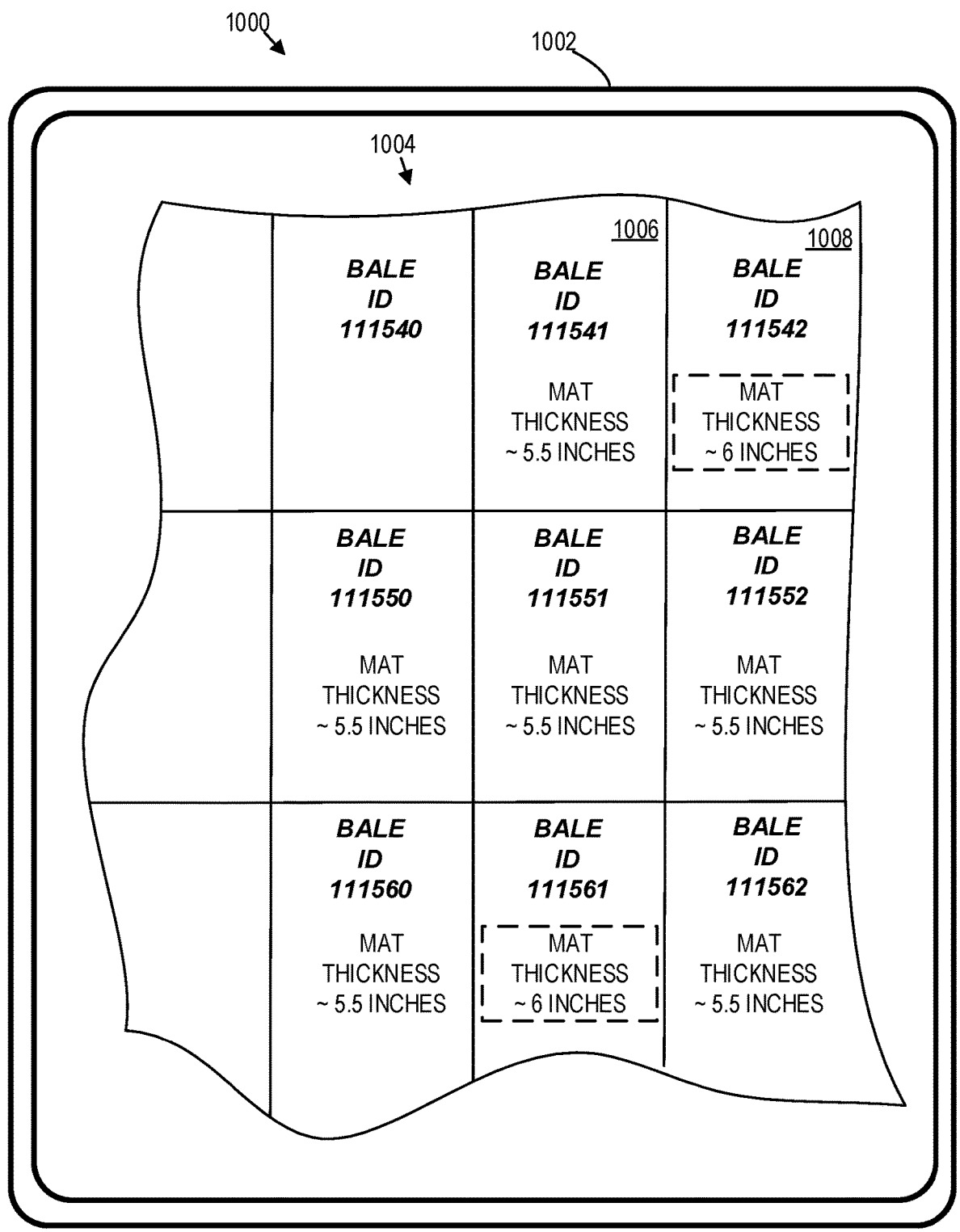
FIG. 10 illustrates an example yield map of discharged bales, in accordance with some embodiments of the present disclosure.

As shown in FIG. 10, a yield map (e.g., see yield map 1004) shows the estimated mat thickness or bale density for each respective location a bale was produced or discharged in a field. Each respective location is associated with a corresponding sector of a field including the crop (e.g., see sectors 1006 and 1008). This is important because being able to trace estimated mat thickness or bale density of bales produced or discharged within a crop field provides a significant agronomic value.

In some embodiments, the yield map 1004 is combined with a second type of yield map. The advantage of such a combination is that it provides additional information on the possible factors for the estimated mat thicknesses or bale densities of bales represented in the yield map. In some examples, the yield map showing estimated mat thicknesses or bale densities is combined with different types of agriculture informational maps such as a soil quality map, a soil moisture map, a soil pH-level map, or a crop or carbon density map. Such combined maps are then useable to analyze a crop and its field and possibly improve farming practices or some other variance in bales harvested from a field.

FIG. 10 illustrates display 1002 of user interface device 1000. The display 1002 is shown displaying yield map 1004. The yield map 1004 provides estimated mat thicknesses associated with different bales in different locations of a crop field. As shown in FIG. 10, each sector of the yield map 1004 includes a respective bale identification number of a bale in the sector and an estimated mat thickness for the bale. Also, the yield map 1004 provides indicators that graphically represent when mat thicknesses is above an acceptable standard or a selected quality. In the case of yield map 1004, the acceptable or selected mat thickness is a thickness under 6 inches. The indicators in yield map 1004 are shown by a dashed-line rectangle that contains the corresponding mat thickness. As shown, for example, sector 1006 includes the attribute of the bale that is of an acceptable level. Whereas, sector 1008 includes a mat thickness that is above an acceptable or selected level and thus the bale density is below an acceptable or selected level as well.

Figure 11:
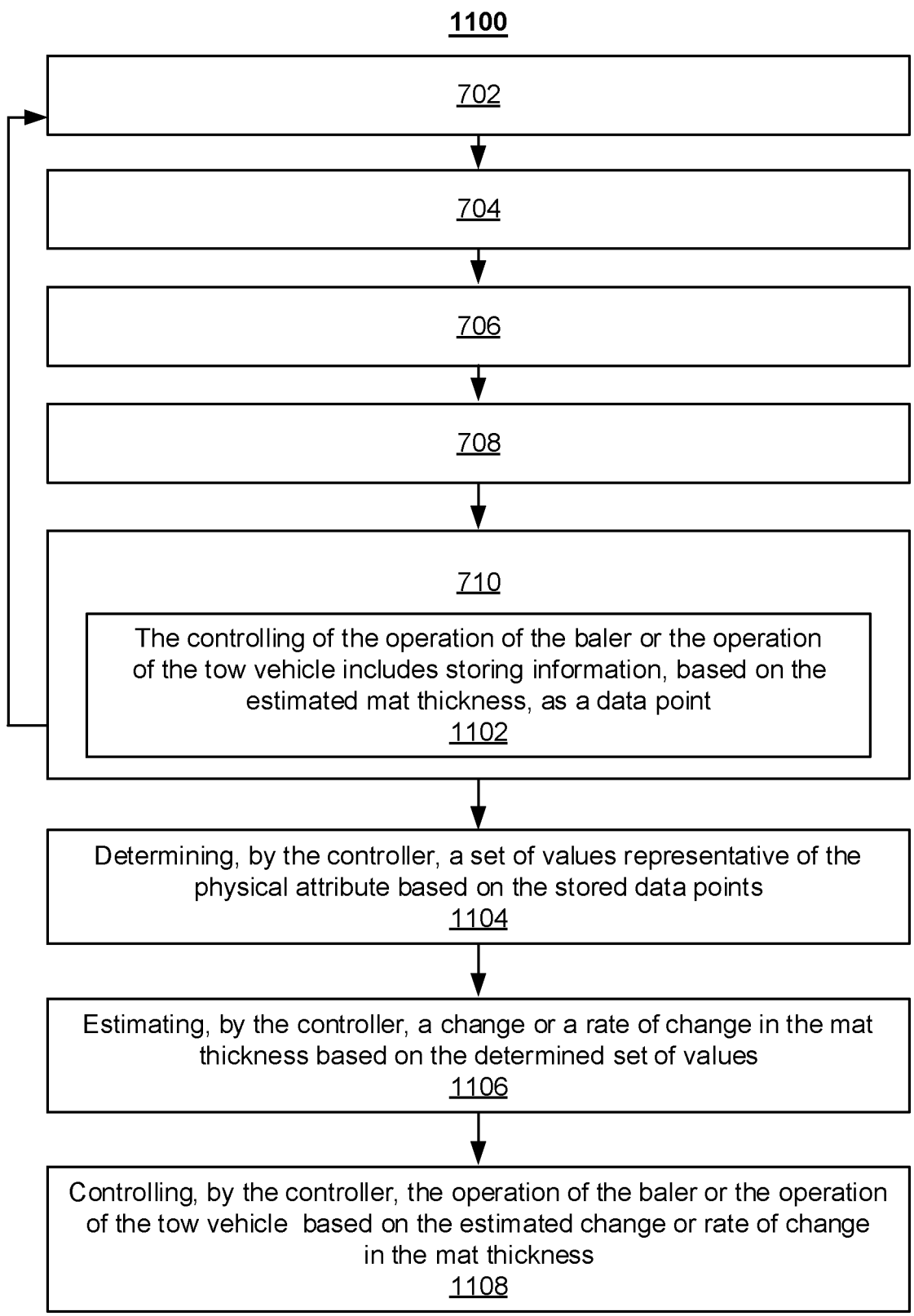
Figure 12:
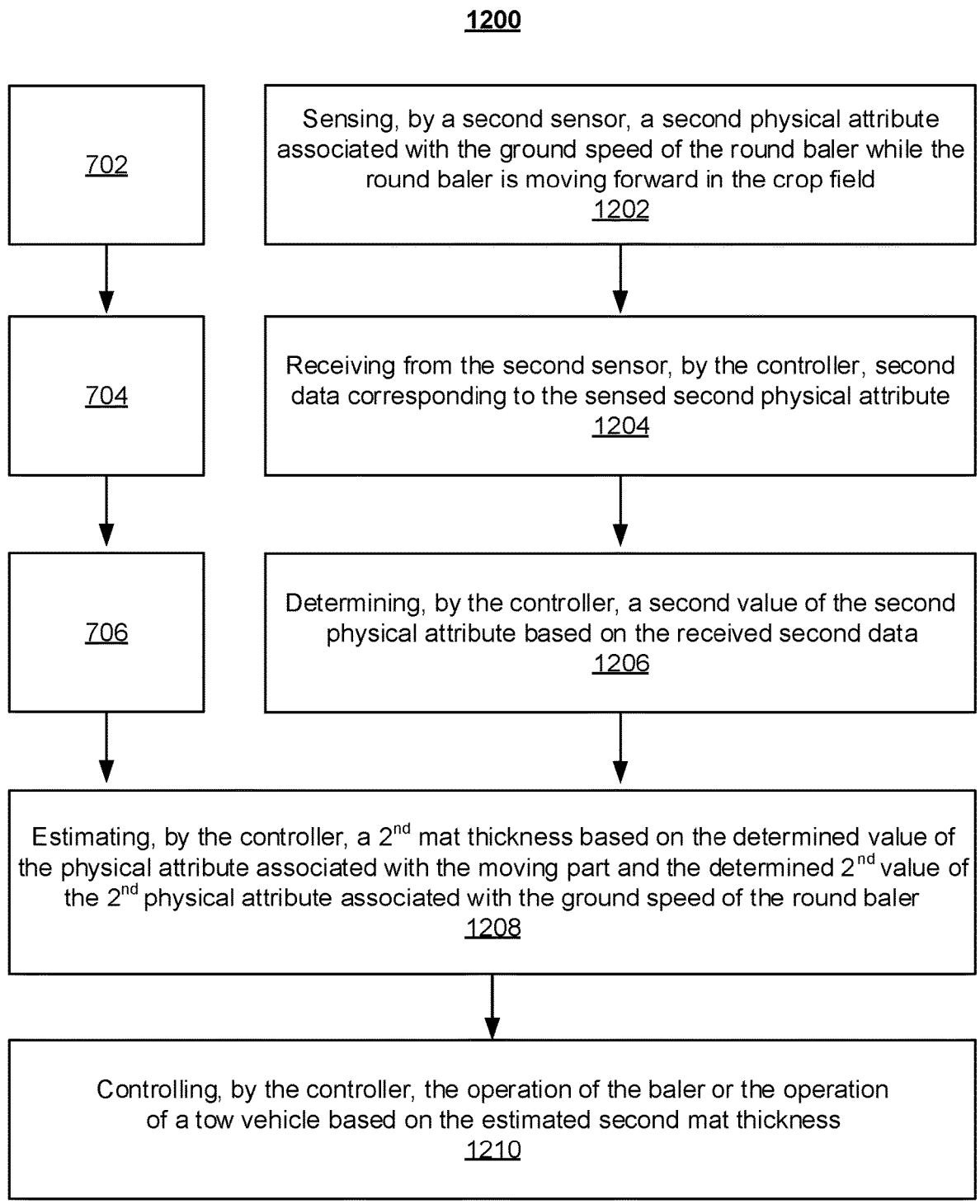
Figure 13:
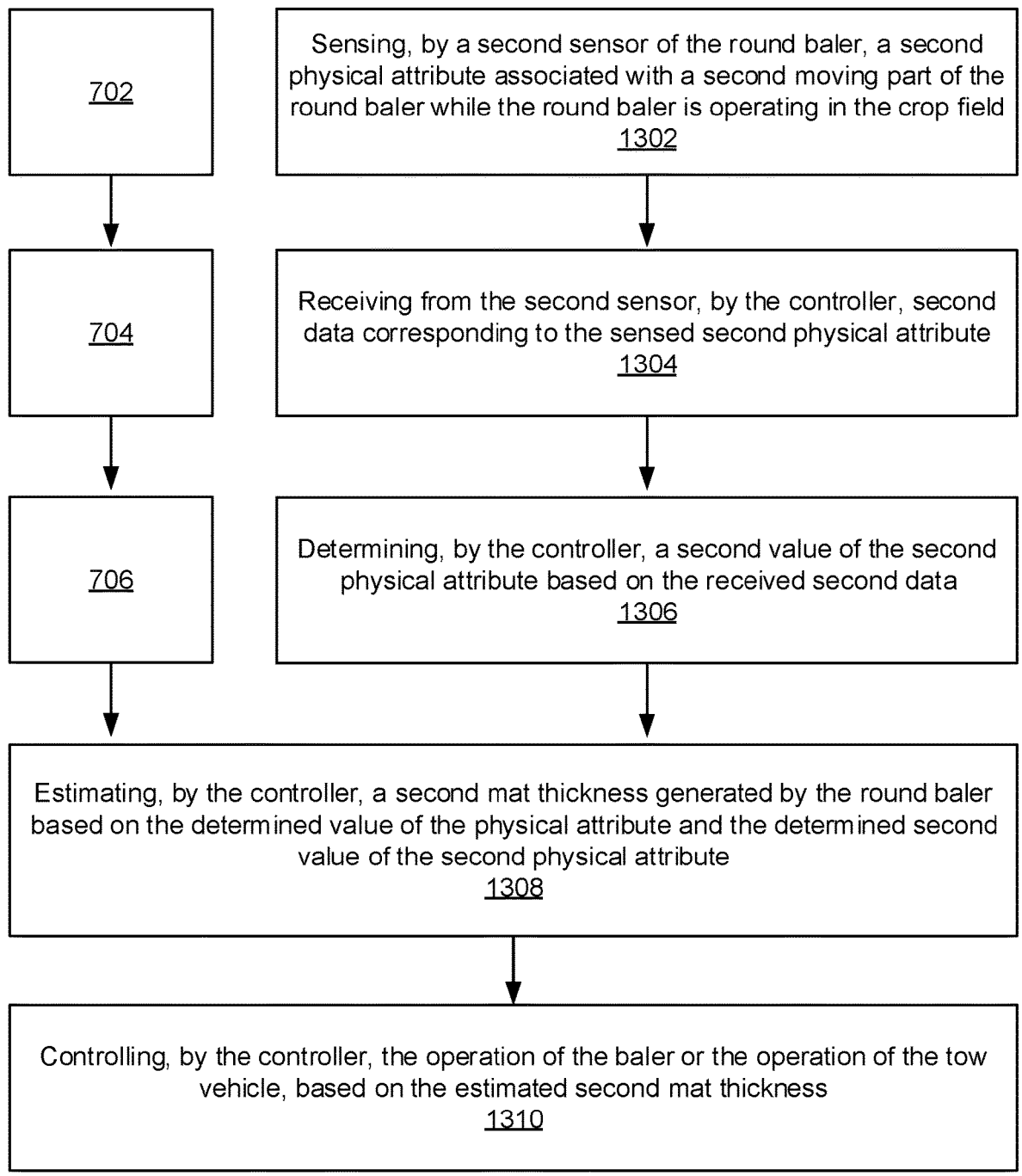

FIGS. 11, 12, and 13 illustrate methods 1100, 1200, and 1300, respectively, in accordance with some embodiments of the present disclosure.

Method 1100 includes steps 702, 704, 706, 708, and 710 of method 700. In method 1100, the controlling of the operation of the baler or the operation of the tow vehicle at step 710, includes storing information, based on the estimated mat thickness, as a data point (see step 1102). In method 1100, steps 702, 704, 706, 708, and 710 of method 700 are repeated with each generation or discharge of a bale from the baler. This allows for a stored set of data points. At step 1104, the method continues with determining, by the controller, a set of values representative of the physical attribute based on the stored data points. The method 1100 also includes step 1106, which includes estimating, by the controller, a change or a rate of change in the mat thickness based on the determined set of values. Finally, the method 1100 includes step 1108, which includes controlling, by the controller, the operation of the baler or the operation of the tow vehicle based on the estimated change or rate of change in the mat thickness. Not depicted in the drawings, in some examples, the method 1100 also includes a display device displaying a yield map with the estimated change or rate of change in the mat thickness instead of displaying a yield map with the mat thickness per bale per sector.

Method 1200 includes steps 702, 704, and 706 of method 700. Additionally, method 1200 includes step 1202, which includes sensing, by a second sensor, a second physical attribute associated with the ground speed of the round baler while the round baler is moving forward in the crop field. Method 1200 also includes step 1204, which includes receiving from the second sensor, by the controller, second data corresponding to the sensed second physical attribute. Also, method 1200 includes step 1206, which includes determining, by the controller, a second value of the second physical attribute based on the received second data. At step 1208, the method includes estimating, by the controller, a second mat thickness based on the determined value of the physical attribute associated with the moving part (which is determined from steps 702, 704, and 706) and the determined second value of the second physical attribute associated with the ground speed of the round baler (which is determined from steps 1202, 1204, and 1206). Finally, the method 1200 continues with step 1210, which includes controlling, by the controller, the operation of the baler or the operation of a tow vehicle based on the estimated second mat thickness.

Method 1300 also includes steps 702, 704, and 706 of method 700. Additionally, method 1300 includes step 1302, which sensing, by a second sensor of the round baler, a second physical attribute associated with a second moving part of the round baler while the round baler is operating in the crop field. Method 1300 also includes step 1304, which includes receiving from the second sensor, by the controller, second data corresponding to the sensed second physical attribute. Also, method 1300 includes step 1306, which includes determining, by the controller, a second value of the second physical attribute based on the received second data. At step 1308, the method includes estimating, by the controller, a second mat thickness generated by the round baler based on the determined value of the physical attribute (which is determined from steps 702, 704, and 706) and the determined second value of the second physical attribute (which is determined from steps 1302, 1304, and 1306). Finally, the method 1300 continues with step 1310, which includes controlling, by the controller, the operation of the baler or the operation of the tow vehicle, based on the estimated second mat thickness.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a predetermined preferred result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that these and similar terms are to be associated with the appropriate physical quantities and are merely convenient labels applied to these quantities. The present disclosure can refer to the action and processes of a computing system, or similar electronic computing device, that manipulates and transforms data represented as physical (electronic) quantities within the computing system's registers and memories into other data similarly represented as physical quantities within the computing system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computing system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computing system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

While the invention has been described in conjunction with the specific embodiments described herein, it is evident that many alternatives, combinations, modifications and variations are apparent to those skilled in the art. Accordingly, the example embodiments of the invention, as set forth herein are intended to be illustrative only, and not in a limiting sense. Various changes can be made without departing from the spirit and scope of the invention.

What is claimed is:

1. A method, comprising:
 sensing, by a sensor of a round baler, a physical attribute associated with a moving part of the round baler while the round baler is operating in a crop field;
 receiving from the sensor, by a controller of the round baler, data corresponding to the sensed physical attribute;
 determining, by the controller, a value of the physical attribute based on the received data;
 estimating, by the controller, a mat thickness generated by the round baler based on the determined value of the physical attribute; and
 controlling, by the controller, an operation of the round baler or an operation of a tow vehicle, configured to tow the round baler, based on the estimated mat thickness,
 wherein the sensor is a pressure sensor, and wherein the sensed physical attribute is a sensed pressure associated with the moving part.

2. The method of claim 1, wherein the moving part is a tension arm of the round baler, wherein the tension arm is operable to expand or contract a perimeter comprising compression belts of the round baler, and wherein the perimeter is a structure and mechanism for holding and forming the bale by exerting tension on outer portions of the bale.

3. A method, comprising:
 sensing, by a sensor of a round baler, a physical attribute associated with a moving part of the round baler while the round baler is operating in a crop field;
 receiving from the sensor, by a controller of the round baler, data corresponding to the sensed physical attribute;
 determining, by the controller, a value of the physical attribute based on the received data;
 estimating, by the controller, a mat thickness generated by the round baler based on the determined value of the physical attribute; and
 controlling, by the controller, an operation of the round baler or an operation of a tow vehicle, configured to tow the round baler, based on the estimated mat thickness,
 wherein the moving part is a movable floor of a crop pickup portion of the round baler, and wherein the movable floor is a flex pivot floor or a fixed pivot floor.

4. The method of claim 1, wherein the controlling of the operation comprises changing ground speed of the round baler automatically without input from an operator.

5. The method of claim 1, further comprising displaying, by a display device, information to an operator of the round baler or the tow vehicle such that the information directs the operator to change a ground speed of the round baler, based on the estimated mat thickness.

6. A method, comprising:
 sensing, by a sensor of a round baler, a physical attribute associated with a moving part of the round baler while the round baler is operating in a crop field;
 receiving from the sensor, by a controller of the round baler, data corresponding to the sensed physical attribute;
 determining, by the controller, a value of the physical attribute based on the received data;
 estimating, by the controller, a mat thickness generated by the round baler based on the determined value of the physical attribute;
 controlling, by the controller, an operation of the round baler or an operation of a tow vehicle, configured to tow the round baler, based on the estimated mat thickness;
 discharging, by the round baler, multiple bales; and
 displaying, by a display device, a yield map based on tracking of the discharged multiple bales and the estimated mat thickness.

7. A method, comprising:
- sensing, by a sensor of a round baler, a physical attribute associated with a moving part of the round baler while the round baler is operating in a crop field;
- receiving from the sensor, by a controller of the round baler, data corresponding to the sensed physical attribute:
- determining, by the controller, a value of the physical attribute based on the received data;
- estimating, by the controller, a mat thickness generated by the round baler based on the determined value of the physical attribute;
- controlling, by the controller, an operation of the round baler or an operation of a tow vehicle, configured to tow the round baler, based on the estimated mat thickness;
- repeating the sensing of the physical attribute while the round baler is operating in the crop field to obtain a set of data points of the physical attribute;
- receiving, by the controller, the set of data points;
- determining, by the controller, a set of values representative of the physical attribute based on the set of data points;
- estimating, by the controller, a change or a rate of change in the mat thickness based on the determined set of values; and
- controlling, by the controller, the operation of the round baler or the operation of the tow vehicle based on the estimated change or rate of change in the mat thickness.

8. A system, comprising a computing device, comprising a processor and a non-transitory computer-readable storage medium for tangibly storing thereon computer program code for execution by the processor, the computer program code comprising:
- executable logic executable to receive, from a sensor, data corresponding to a sensed physical attribute associated with a moving part of a round baler while the round baler is operating in a crop field, wherein the sensor is a part of the round baler, and wherein the sensor senses the physical attribute;
- executable logic executable to determine a value of the physical attribute based on the received data;
- executable logic executable to estimate a mat thickness generated by the round baler based on the determined value of the physical attribute; and
- executable logic executable to control an operation of the round baler or an operation of a tow vehicle, configured to tow the round baler, based on the estimated mat thickness,
- wherein the sensor is a pressure sensor, and wherein the sensed physical attribute is a sensed pressure associated with the moving part.

9. A non-transitory computer-readable storage medium tangibly encoded with computer-executable instructions, that when executed by a processor of a computing device the processor performs a method comprising the following operations:
- receiving, from a sensor, data corresponding to a sensed physical attribute associated with a moving part of a round baler while the round baler is operating in a crop field, wherein the sensor is a part of the round baler, and wherein the sensor senses the physical attribute;
- determining a value of the physical attribute based on the received data;
- estimating mat thickness generated by the round baler based on the determined value of the physical attribute; and
- controlling an operation of the round baler or an operation of a tow vehicle, configured to tow the round baler, based on the estimated mat thickness,
- wherein the sensor is a pressure sensor, and wherein the sensed physical attribute is a sensed pressure associated with the moving part.

\* \* \* \* \*